United States Patent
Milani et al.

(10) Patent No.: US 9,168,466 B2
(45) Date of Patent: Oct. 27, 2015

(54) MULTI-LAYER STEAM GRID FOR HEAT AND MASS TRANSFER IN A TAILINGS SOLVENT RECOVERY UNIT

(75) Inventors: Ali Milani, Calgary (CA); Jianmin Kan, Calgary (CA)

(73) Assignee: TOTAL E&P CANADA LTD, Calgary (CA)

( * ) Notice: Subject to any disclaimer, the term of this patent is extended or adjusted under 35 U.S.C. 154(b) by 755 days.

(21) Appl. No.: 13/439,638

(22) Filed: Apr. 4, 2012

(65) Prior Publication Data

US 2012/0247944 A1 Oct. 4, 2012

Related U.S. Application Data

(60) Provisional application No. 61/471,301, filed on Apr. 4, 2011.

(51) Int. Cl.
| | |
|---|---|
| *B01D 1/14* | (2006.01) |
| *B01D 1/04* | (2006.01) |
| *C10C 3/06* | (2006.01) |
| *C10G 21/28* | (2006.01) |
| *B01D 3/38* | (2006.01) |
| *B01D 1/22* | (2006.01) |
| *B01D 1/30* | (2006.01) |
| *B01D 21/00* | (2006.01) |
| *B01D 21/24* | (2006.01) |

(52) U.S. Cl.
CPC .. *B01D 1/04* (2013.01); *B01D 1/14* (2013.01); *B01D 1/22* (2013.01); *B01D 1/305* (2013.01); *B01D 3/38* (2013.01); *B01D 21/009* (2013.01); *B01D 21/2494* (2013.01); *C10C 3/06* (2013.01); *C10G 21/28* (2013.01); *B01D 2221/04* (2013.01)

(58) Field of Classification Search
CPC ............ B01D 1/04; B01D 1/14; B01D 1/22; B01D 1/305; B01D 3/38; B01D 2221/104; C10C 3/06; C10G 21/28
USPC ............................................ 203/92; 208/321
See application file for complete search history.

(56) References Cited

U.S. PATENT DOCUMENTS

| | | | | |
|---|---|---|---|---|
| 2,700,644 | A * | 1/1955 | Leffer | 202/91 |
| 6,358,404 | B1 * | 3/2002 | Brown et al. | 208/390 |
| 6,712,215 | B2 | 3/2004 | Scheybeler | |
| 8,741,107 | B2 * | 6/2014 | Kan | 196/14.52 |
| 2010/0126906 | A1 * | 5/2010 | Sury | 208/30 |
| 2011/0278202 | A1 * | 11/2011 | Moran et al. | 208/424 |

FOREIGN PATENT DOCUMENTS

| | | |
|---|---|---|
| CA | 2272045 | 11/2000 |
| CA | 2587166 | 9/2007 |
| CA | 2613873 | 9/2007 |
| CA | 2614669 | 9/2007 |

* cited by examiner

*Primary Examiner* — Renee E Robinson
*Assistant Examiner* — Jonathan Miller
(74) *Attorney, Agent, or Firm* — Goodwin Law; Linda M Thompson

(57) ABSTRACT

A grid of pipes for conducting steam at a pressure greater than a vessels' operating pressure and delivering the steam throughout the grid forms the internals for a tailings solvent recovery unit. The delivery of steam throughout the grid aids in maintaining a relatively low partial pressure throughout the vessel to act as a driver for mass transfer. Conducting the steam at the higher pressure through the pipes in the grid permits a surface of the pipes to be heated to a temperature higher than possible in a conventional vessel, increasing the heat transfer to the feed stream which flows through the grid.

18 Claims, 15 Drawing Sheets

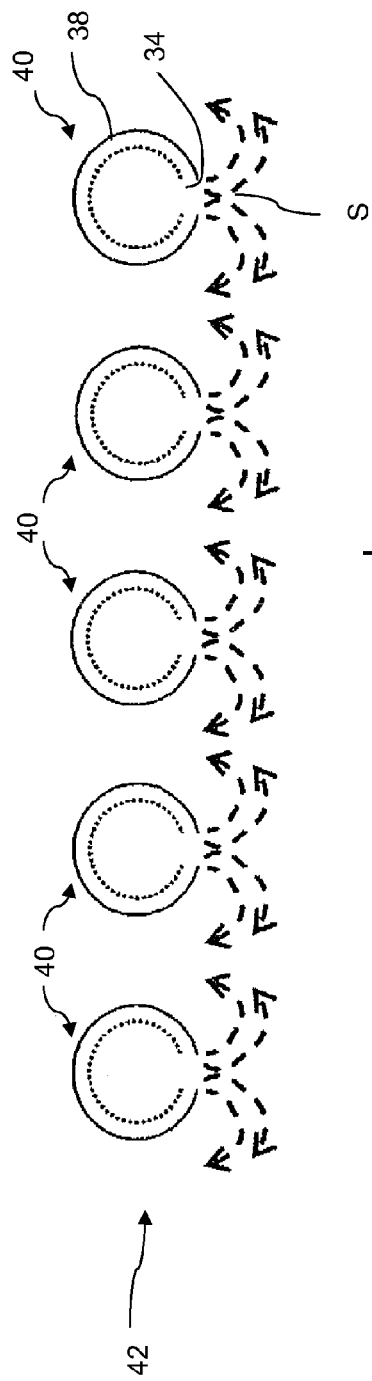
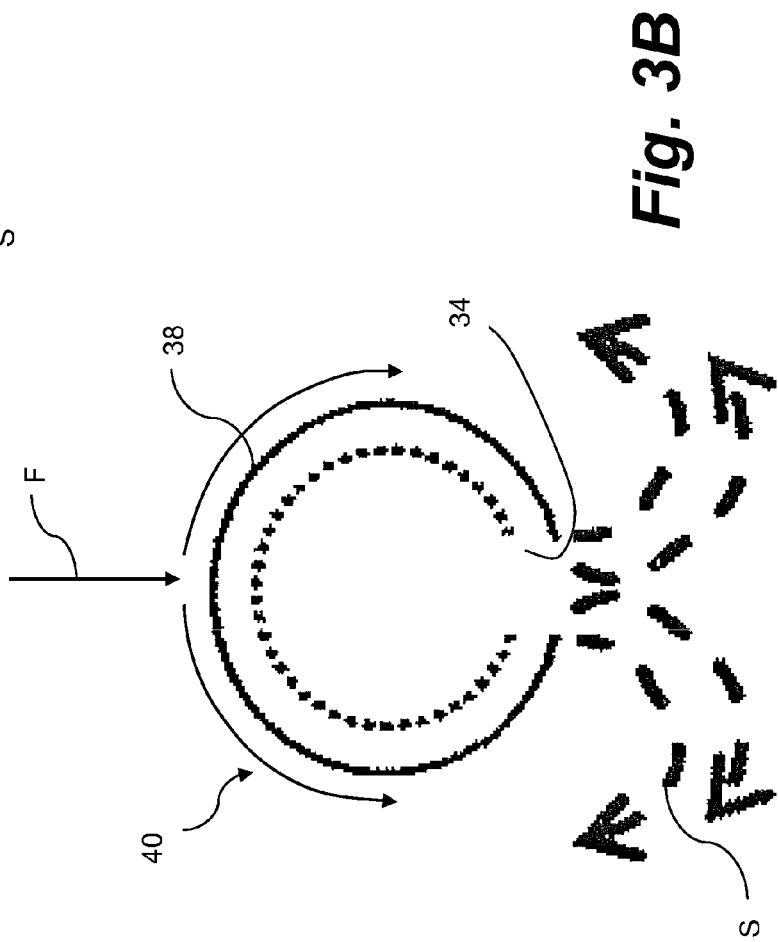
Fig. 3A
Fig. 3B

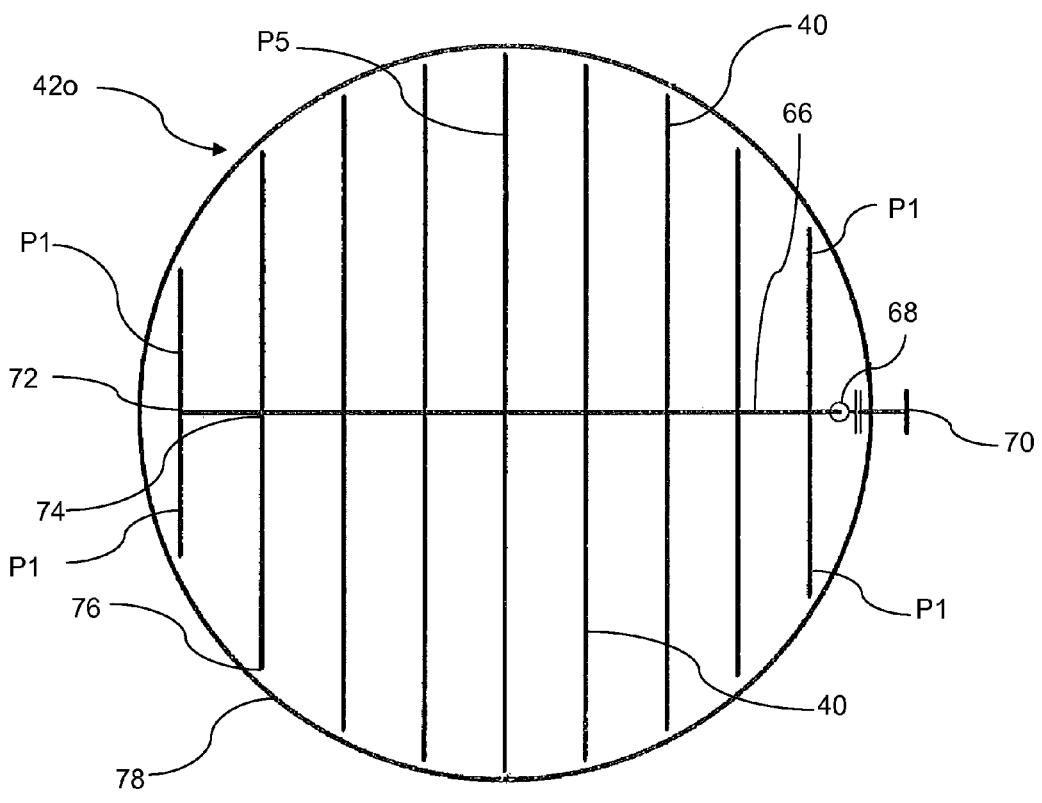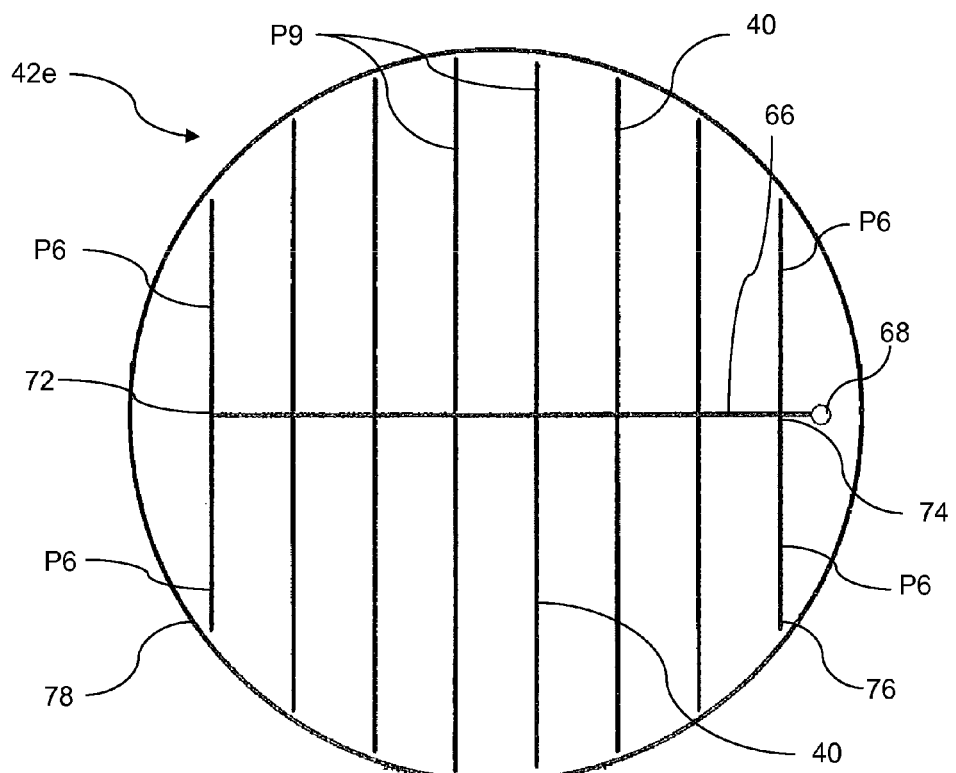
Fig. 10

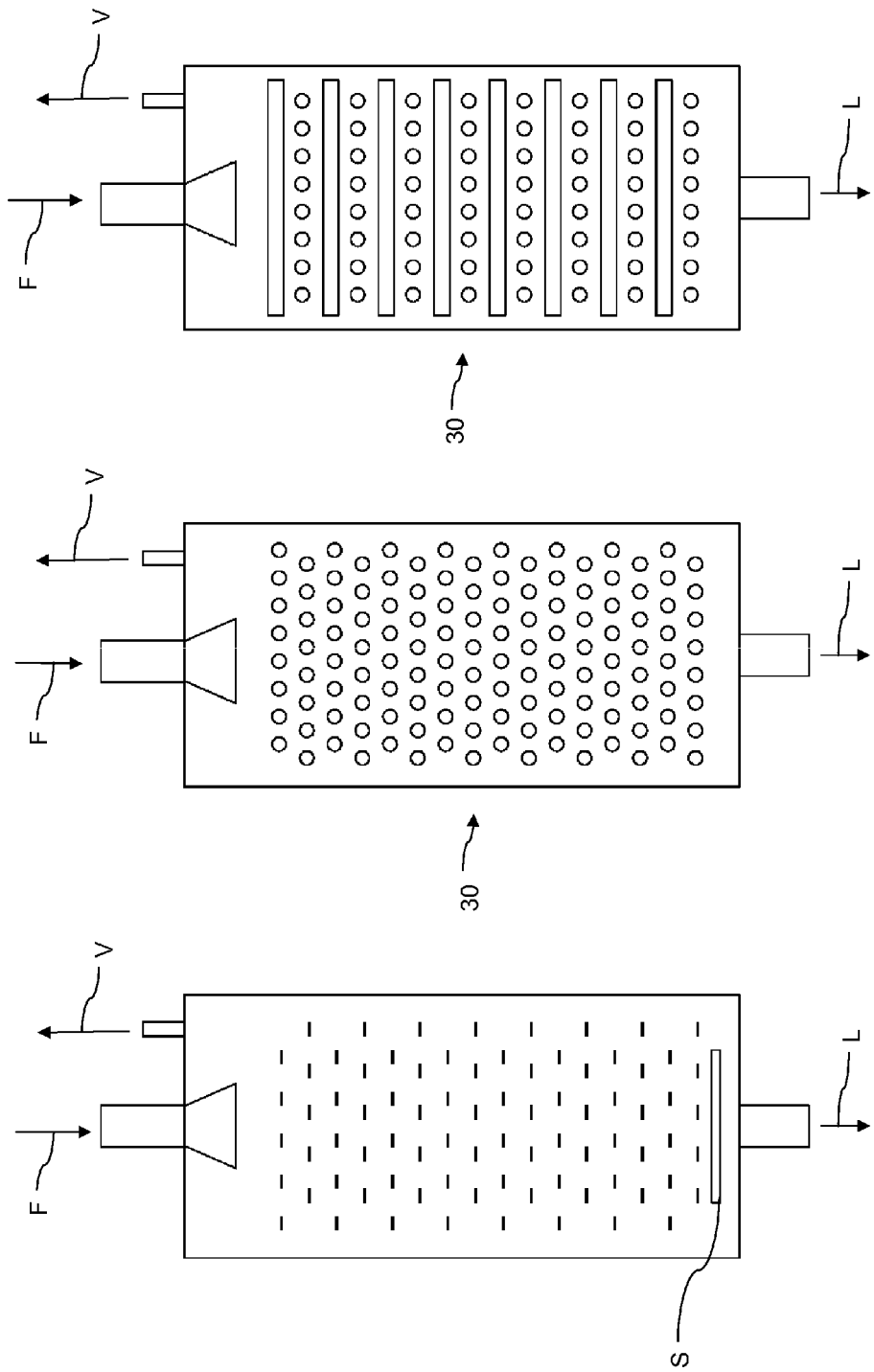

MULTI-LAYER STEAM GRID FOR HEAT AND MASS TRANSFER IN A TAILINGS SOLVENT RECOVERY UNIT

CROSS-REFERENCE TO RELATED APPLICATIONS

This application claims the benefit of U.S. provisional application 61/471,301, filed Apr. 4, 2011, the entirety of which is incorporated herein by reference.

FIELD OF THE DISCLOSURE

Embodiments relate to the recovery of hydrocarbon diluent from tailings resulting from the treatment of bitumen froth formed during bitumen recovery from oil sands and, more particularly, relate to apparatus for distributing steam within a vessel for the recovery of the hydrocarbon diluent from said hydrocarbon diluent-containing tailings.

BACKGROUND

Bitumen is produced from oil sand such as is found in the Fort McMurray region of Alberta, Canada. The oil sand is mined and has been commercially recovered using hot water processes which generally require slurrying the oil sand with at least heated water or steam. The slurry is conditioned and the resulting froth separated from the solids portion for recovery of the bitumen therefrom.

The bitumen-containing froth is typically diluted with a hydrocarbon diluent, such as a naphthenic or paraffinic solvent, to reduce the viscosity and to aid in separating the bitumen from water and solids contained in the froth. Separation of the bitumen from the solids and water typically results in a bitumen-rich stream and a solvent-containing tailings feed stream.

In order to improve the economics of the bitumen recovery processes and the environmental impact of tailings disposal, solvent recovery apparatus and processes, generally known as tailings solvent recovery units (TSRU) are employed to recover the solvent from the solvent-containing tailings stream prior to disposal. The recovered solvent is typically recycled for use in the froth treatment processes. Conventional solvent recovery is typically effected by increasing the surface area of the solvent-containing tailings feed stream by creating a thin film of feed using internals such as shed decks or by retaining a pool of solvent containing tailings within the vessel for sufficient time, typically at least 5 to 15 minutes, to permit solvent release from the pool.

U.S. Pat. No. 6,712,215 to Scheybeler describes a solvent recovery vessel having pairs of nozzles located within the vessel. Each pair of nozzles is arranged horizontally in a 180-degree, opposed relationship. The nozzles have a first inlet for receiving solvent-containing tailings and a second inlet for receiving steam. A single outlet discharges a mixed steam/tailings stream. Adiabatic expansion of the steam, when contacted with the tailings, carries the discharge stream at high speed toward a centre of the vessel. The opposing orientation of the nozzles causes the discharge streams to collide at high speed forming small droplets in the vessel. The relatively larger surface area of the droplets facilitates release of the solvent from the liquid phase to the vapour phase. Shed decks located below the collision zone are heated using a steam sparger located beneath the shed decks and act to spread the droplets into thin layers thereon to facilitate heat transfer resulting in further solvent release. Another steam sparger is located in a lower portion of the column and further aids in stripping residual solvent from the liquid within the vessel. Pressure in the vessel is maintained at sub-atmospheric conditions through use of a steam eductor.

Canadian Patent 2,272,045 to Mocal Energy Limited et al (Syncrude) teaches introduction of froth treatment tailings into a near-atmospheric steam stripping TSRU vessel having a plurality of interior, vertically-spaced shed decks. The liquid tailings stream is evenly distributed over the shed decks creating a thin film of the liquid feed on an upper surface of the shed decks. Steam is introduced below the vertically-spaced shed decks and flows countercurrent to the tailings stream in order to vapourize the hydrocarbon diluents from the thin film of feed material. The vessel is preferably maintained at near atmospheric conditions (about 95 kPa).

Canadian Patents 2,587,166, 2,613,873 and 2,614,669 to Imperial Oil Resources Limited teach steam stripping TSRU vessels having internals, typically shed decks, with feed streams that contain asphaltenes. Both one-stage and two-stage processes are claimed. Steam is introduced below the internals or directly into a pool of liquids in the vessel and, in all cases, no agitation is utilized to mix the contents of the pool. At least a first TSRU vessel is operated at an absolute pressure between 100 kPa-200 kPa and at a temperature of between 75° C. and 100° C. A second TSRU is contemplated and is operated at a pressure lower than the first TSRU, being about 20-200 kPa and preferably 25-100 kPa and at a temperature of between 75° C. and 100° C. Additional TSRU vessels are contemplated to be added in series.

In the prior art vessels, steam is generally injected below the internals, such as shed decks and the like. The temperature of the internals therefore can only become as hot as the temperature of the steam being condensed at vessel operating pressures. The internals in the vessel therefore provide a relatively poor heat transfer surface, particularly where the feed contains asphaltenes which require significant heat to soften and release solvents trapped therein.

Further, in conventional TSRU's, the majority of the steam is condensed in contact with the tailings feed stream at the bottom of the vessel to transfer heat to the tailings stream. As a result, the partial pressure of the solvent is higher at the top of the vessel compared to the bottom of the vessel. The concentration of solvent vapour is also highest at the top of the vessel and therefore there is less impetus for mass transfer within the vessel.

There remains significant interest in the industry for apparatus and processes which result in more efficient and effective solvent recovery, particularly for feed streams which contain paraffinic solvents and asphaltenes resulting therefrom and to meet ever more stringent regulations regarding minimizing solvent loss and tailings disposal generally.

SUMMARY

Embodiments disclosed herein utilize internals for a tailings solvent recovery unit (TSRU) which conduct steam therethrough at a pressure greater than a vessels' operating pressure for heating a surface of the internals to a temperature higher than possible at the vessels' operating pressure and temperature, enhancing heat transfer to a tailings feedstream flowing thereover and therethrough. The steam is discharged from a plurality of locations throughout the internals, substantially throughout a vertical height of the internals and across a cross-section of the vessel, resulting in a relatively low partial pressure throughout the vessel for enhancing mass transfer.

Applicant believes that embodiments of the disclosure maximize the synergistic effects of the enhanced heat transfer and mass transfer within the TSRU vessel to increase the efficiency of solvent recovery therein.

In a broad aspect, a method is disclosed for recovering solvent from a non-homogeneous solvent-containing tailings feed stream in a vessel having internals therein. The method comprises flowing the solvent-containing tailings feedstream from a top of the vessel, about the internals and to a bottom of the vessel. Steam is discharged to the vessel at a plurality of locations throughout the internals, the steam flowing countercurrent to the solvent-containing tailings feedstream in the vessel. Solvent vapour is removed from the top of the vessel and a solvent-depleted tailings stream is discharged from the bottom of the vessel. The steam flows throughout the internals at a pressure greater than a vessel operating pressure for heating the internals to a temperature greater than a vessel temperature.

In another broad aspect, a tailings solvent recovery unit comprises a substantially vertical vessel having an operating pressure and temperature. A feed inlet is adjacent a top of the vessel for receiving a non-homogeneous solvent-containing tailings feed stream therethrough. Internals extend vertically throughout the vessel, steam being conducted through the internals at a pressure greater than the vessel operating pressure, the steam being discharged therefrom at a plurality of locations therethrough and flowing countercurrent to the feed stream. A vapour outlet at a top of the vessel permits removal of solvent vapour released from the solvent-containing tailings feed stream. A solvent-depleted tailings outlet at the bottom of the vessel permits removal of the solvent-depleted tailings stream. A surface of the internals is heated by the steam to a temperature greater than the vessel operating temperature, the feed stream contacting the surface of the internals for heat transfer thereto as the feed stream flows about the internals.

In yet another broad aspect, the internals comprise a steam grid adapted for delivering steam to a tailings solvent recovery vessel having an operating pressure and temperature. The steam grid comprises a vertically-extending grid of fluidly-connected steam delivery pipes for conducting steam at a pressure greater than vessel pressure. The steam grid has a vertical height and a diametral extent and a plurality of steam outlets distributed therein, along the vertical height and across the diametral extent of the steam grid for discharging steam therefrom along substantially an entirety of the vertical height and substantially an entirety of a cross-section of the vessel. The outlets are sized for conducting steam within the steam delivery pipes at a pressure greater than the vessel's operating pressure, heating an outer surface of the steam delivery pipes to a temperature greater than the vessel's operating temperature.

In embodiments, the plurality of fluidly-connected steam delivery pipes are arranged in transverse layers forming a vertically extending grid of layers. The transverse layers substantially fill a cross-section of the vessel. The steam delivery pipes in each of the layers are spaced apart and parallel. The steam grid provides a tortuous path for the feed stream flowing therethrough. The pipes in each layer can be oriented in the same direction as pipes in an adjacent layer or can be angled relative to the pipes in the adjacent layer, such being oriented 90 degrees relative to the pipes in an adjacent layer. Further, where the pipes are oriented in the same direction, either adjacent or every other layer, the pipes can be spaced to be laterally offset.

In embodiments, the steam delivery pipes are substantially circular in cross-section which causes the feed stream to flow thereabout toward steam outlets or orifices which are positioned in a downward-facing surface of the pipes. The feed stream contacts the steam exiting the orifices. Any remaining steam flows upward therefrom through the grid for contacting the feed stream flowing therethrough.

Advantageously, steam which condenses in the pipes is delivered from the orifices as a spray which aids in preventing cake build-up on the pipes below. Further, any foam which may form falls through openings in the grid between the pipes onto the pipes below, breaking the foam. Thus, foam production in the vessel is reduced.

BRIEF DESCRIPTION OF THE DRAWINGS

FIG. 3A is a cross-sectional view of a layer of fluidly-connected steam delivery pipes of the multi-layer steam grid of FIG. 2;

FIG. 3B is a cross-sectional view of a single steam delivery pipe according to FIG. 3A;

FIG. 4A is an end view of three adjacent layers; and FIG. 4B is a plan view according to FIG. 4A;

FIG. 5A is an end view of three adjacent layers; and FIG. 5B is a plan view according to FIG. 5A;

FIG. 6A is an end view of three adjacent layers; and FIG. 6B is a plan view according to FIG. 6A;

FIG. 10 is a plan view of odd numbered and even numbered layers in a multi-layer steam grid according to FIG. 8, the layers being viewed side-by-side for comparison;

FIGS. 13A to 13C illustrate multi-layer internals used for testing and comparison of solvent recovery efficiency between a prior art configuration and two different embodiments of the disclosure; more particularly;

FIG. 13A illustrates a prior art arrangement of flat metal plates, steam being delivered therebelow;

FIG. 13B illustrates a steam grid according to FIG. 11;

FIG. 13C illustrates a steam grid according to FIGS. 4A and 4B; and

DETAILED DESCRIPTION OF THE PREFERRED EMBODIMENT

Embodiments disclose apparatus and a method for recovering solvent from a solvent-containing tailings feed stream F produced as an underflow stream from a froth treatment facility. A typical feed stream F is generally non-homogeneous and comprises about 61% water, 7% solvent, 12% bitumen and 20% solids. Thus, unlike the feed streams used with conventional steam stripper technology, the solvent-containing tailings feedstream F is unlikely to form an ideal falling film as it flows through internals in a tailings solvent recovery (TSRU) vessel.

Figure 1:
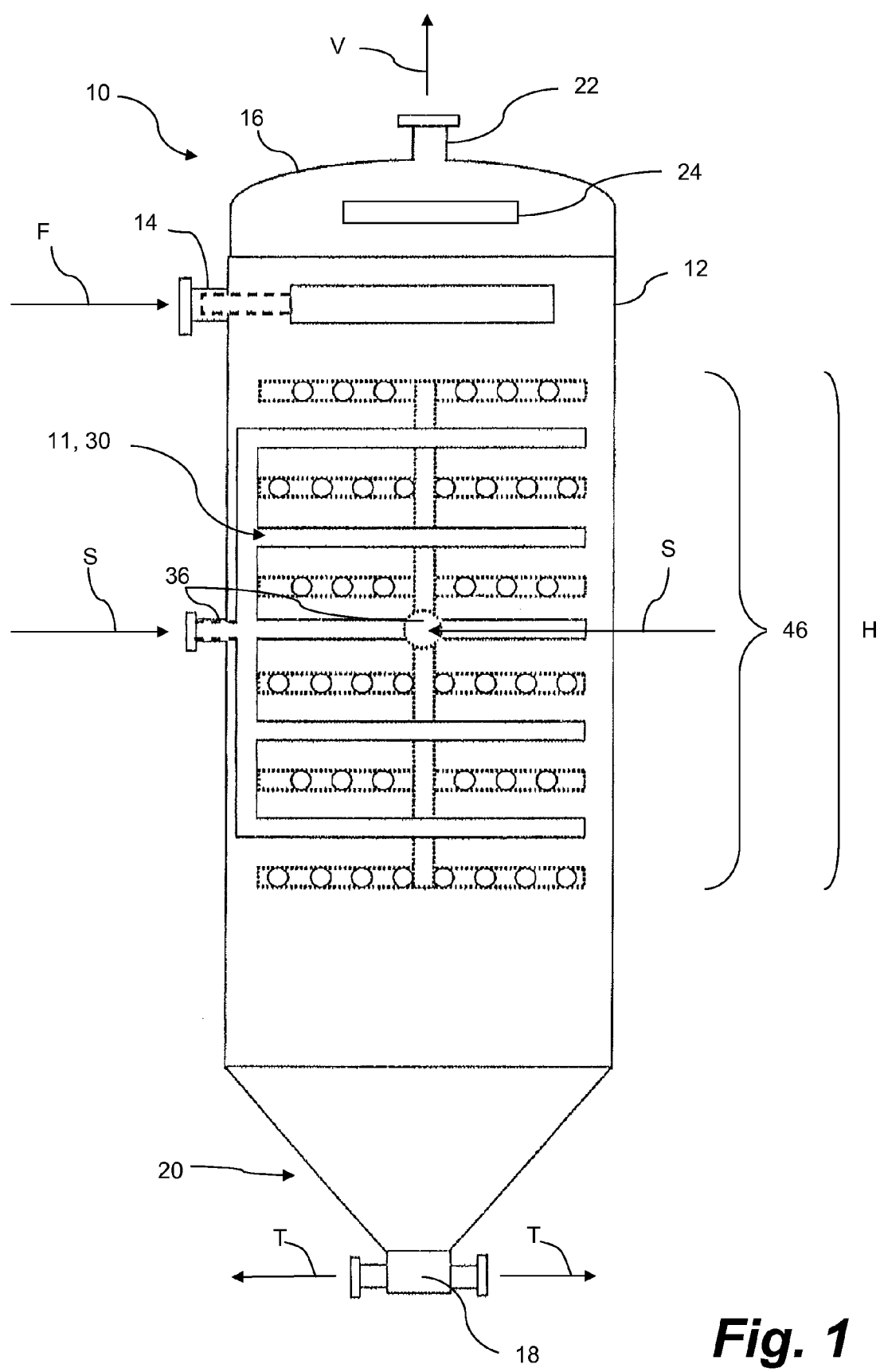
FIG. 1 is a diagrammatic representation of a cross-sectional view of a tailings solvent recovery unit (TSRU) vessel having a multi-layer steam grid according to an embodiment of the disclosure.

In embodiments, as shown in FIG. 1, internals 11 in a tailings solvent recovery unit (TSRU) stage 10 conduct steam S therethrough and discharge steam S at a plurality of locations along a height H of the internals 11 and across a cross-section of the TSRU vessel 12. The steam S is conducted therethrough at a pressure higher than a vessel pressure for steam-heating the internals 11 to a temperature greater than would normally be possible at a vessel operating pressure, resulting in an increased heat transfer to the feedstream flowing therethrough. Further, delivery of steam S at the plurality of locations results in a relatively low partial pressure substantially throughout the vessel 12 when compared to a TSRU with conventional internals, the relatively low partial pressure being a driver for promoting mass transfer therein.

In an embodiment the discharge of steam at the plurality of locations is throughout substantially the entirety of the height H of the internals 11 and across substantially the entirety of the cross-section of the TSRU vessel 12.

The TSRU 10 comprises a vertical vessel 12 having a feed inlet 14 adjacent a top 16 of the vessel 12 for introducing the solvent-containing tailings feed stream F to the vessel 12. A tailings outlet 18 at the bottom 20 of the vessel 12 discharges substantially solvent-depleted tailings T from the vessel 12. A vapour outlet 22 at the vessel's top 16 discharges solvent vapour V, released from the feed stream F within the vessel 12. The feed stream F is discharged through the feed inlet 14 into the vessel 12 under a pressure drop. The vessel 12 is operated at a vessel pressure and temperature.

A demister pad 24 can be positioned in the top 16 of the vessel 12 between the feed inlet 14 and the vapour outlet 22 through which recovered vapour V passes for removing entrained liquids therefrom. The recovered vapour V, discharged from the vapour outlet 22, is subsequently cooled to condense the recovered vapour and liquid solvent is recovered therefrom, as is known in the art. The recovered liquid solvent is thereafter recycled for use, typically within the froth treatment process.

In embodiments of the disclosure, internals 11 in the vessel 12 comprise a multi-layer steam grid 30 which extends vertically within the vessel 12 and is located intermediate the feed inlet 14 and the tailings outlet 18. The multi-layer steam grid 30 has the vertical height H and extends to substantially fill a cross-section of the vessel 12. The multi-layer steam grid 30 further comprises a plurality of steam outlets 34 for discharging steam S at the plurality of locations along the vertical height H of the multi-layer steam grid 30 and throughout the cross-section of the vessel 12.

The multi-layer steam grid 30 receives steam S at one or more inlets 36, the steam S conducted within the multi-layer steam grid 30 being at a pressure and temperature greater than the operating pressure and temperature within the vessel 12. The outlets 34 and the steam supply conditions dictate the elevated pressure and temperature in the multi-layer steam grid 30. The elevated pressure within the multi-layer steam grid 30 permits a heat transfer surface 38 of the multi-layer steam grid 30 to be heated to a higher temperature than would be possible if the steam S were at lower pressure, such as at the vessel's operating pressure. Thus, it is possible to heat the feed stream F, which contacts the heat transfer surface 38, to higher temperatures.

TSRU vessel pressure is typically maintained below the vapour pressure of the solvent at the temperature of the feed stream F, which is generally defined by an upstream froth settling unit (FSU). In a conventional TSRU, a majority of steam S provided thereto is condensed to heat agglomerates and liquids in the bottom of the conventional TSRU vessel. As a result, in the conventional TSRU, the concentration of steam S in the vapour phase is lower at a top of the vessel compared to a bottom of the vessel and therefore the solvent partial pressure is higher in the top than in the bottom, which results in reduced diffusivity and inefficient removal of solvent throughout the vessel.

In embodiments, steam discharge at the plurality of locations throughout the internals 11, as a result of the plurality of steam outlets 34 in the multi-layer steam grid 30, results in a relatively low partial pressure substantially throughout the vessel 12. The relatively low partial pressure throughout the vessel is a driver for promoting mass transfer therethrough.

Applicant believes that embodiments of the disclosure maximize the synergistic effects of the enhanced heat transfer and mass transfer within the TSRU vessel 12 to increase the efficiency of solvent recovery therein.

Generally, in a conventional TSRU, as solvent vapourizes from the agglomerates, the agglomerates cool and harden which hinders solvent removal as solvent is trapped therein.

Applicant believes that the increased temperature at the heat transfer surface 38, provided in embodiments of the disclosure, is particularly advantageous where the feed stream F comprises asphaltene agglomerates. Imparting higher temperatures to the agglomerates softens the agglomerates, permitting vapourizing and release of solvent trapped therein. Thus, the prior art problem of removal of solvent entrapped inside the agglomerates is substantially overcome as the higher temperatures achieved at the heat transfer surface 38 of the multi-layer steam grid 30 imparts sufficient heat to keep the agglomerates structurally flexible for a longer period of time, despite vapourization of free (untrapped) solvent therefrom which acts to cool the agglomerates. Prolonging the softened state of the agglomerates permits trapped solvent to be more readily vapourized therefrom.

Figure 2:
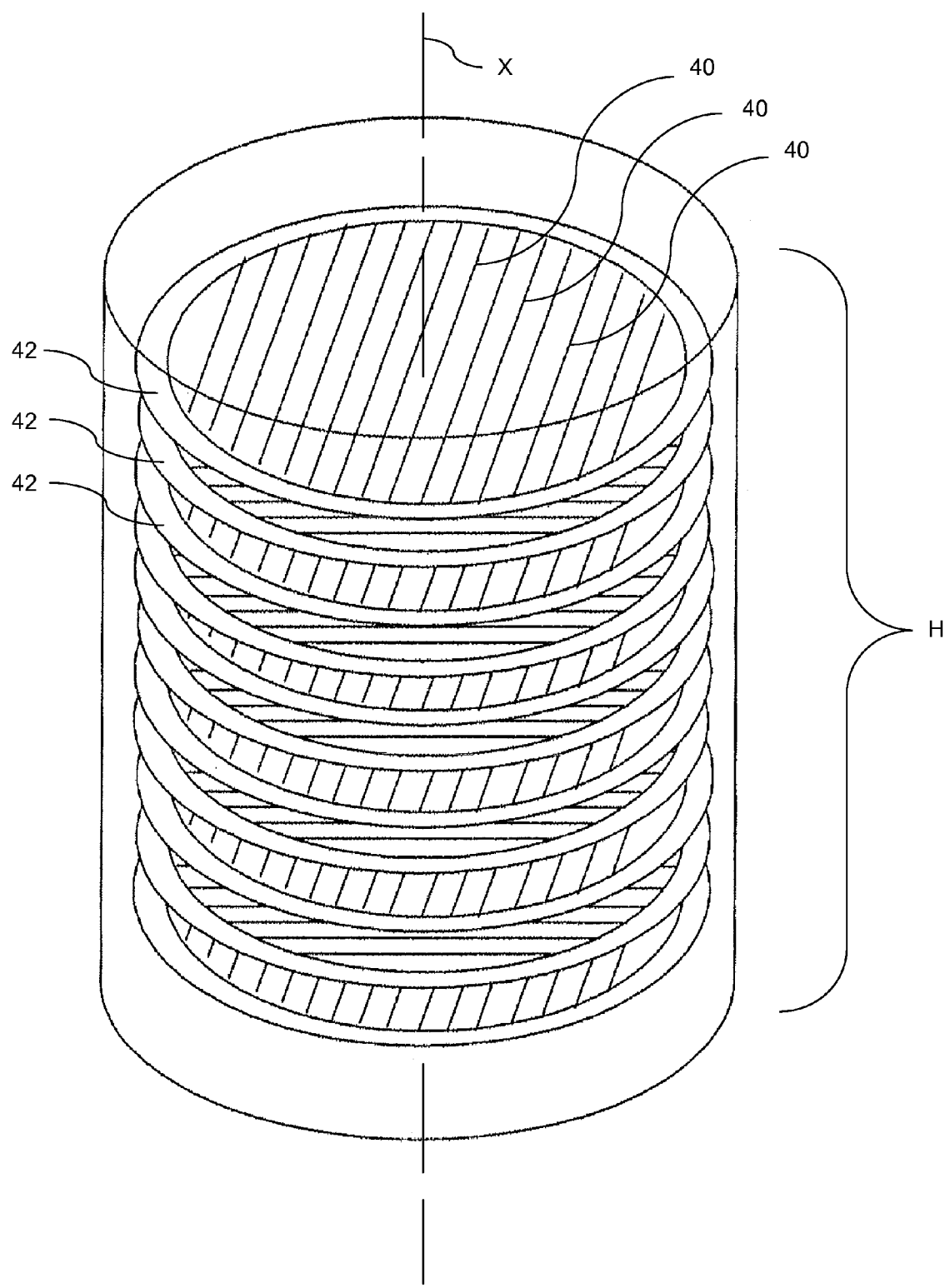
FIG. 2 is a fanciful, perspective view of the steam grid of FIG. 1.

Having reference to FIG. 2, and in an embodiment, the multi-layer steam grid 30 comprises a plurality of fluidly-connected steam delivery pipes 40. The steam delivery pipes 40 are arranged in adjacent layers 42, transverse to a vertical axis X of the vessel 12, forming a vertical stack of layers 42 having the vertical height H. Each of the transverse layers 42 comprises a plurality of the fluidly-connected steam delivery pipes 40 which are substantially parallel to and spaced apart from one another within each layer 42. The steam delivery pipes 40 are spaced to permit vapour flow upwardly and feed stream flow downwardly between the spaced pipes 40.

As shown in detail in FIGS. 3A and 3B, each of the steam delivery pipes 40 in the steam grid 30 has the plurality of steam outlets or orifices 34 formed on a downward-facing surface 44 of the pipe 40 for discharging steam S to the vessel 12. The orifices 34 are sized to maintain the higher pressure and correspondingly higher temperature within the steam delivery pipes 40 compared to the operating pressure and temperature within the vessel 12. As one of skill will appreciate the orifices 34 must not be sized so small as to be at risk of plugging by the feed stream F and therefore the pressure in the steam delivery pipes 40 is dictated by the smallest workable orifice size.

Further, each of the adjacent transverse layers 42 have a diametral extent which extends substantially across the cross-section of the vessel 12. The steam delivery pipes 40 have the plurality of orifices 34 spaced along a length of the pipes for distributing steam S across substantially the entirety of cross-section of the vessel 12 and throughout substantially the entire height H of the steam grid 30.

Figure 4A:
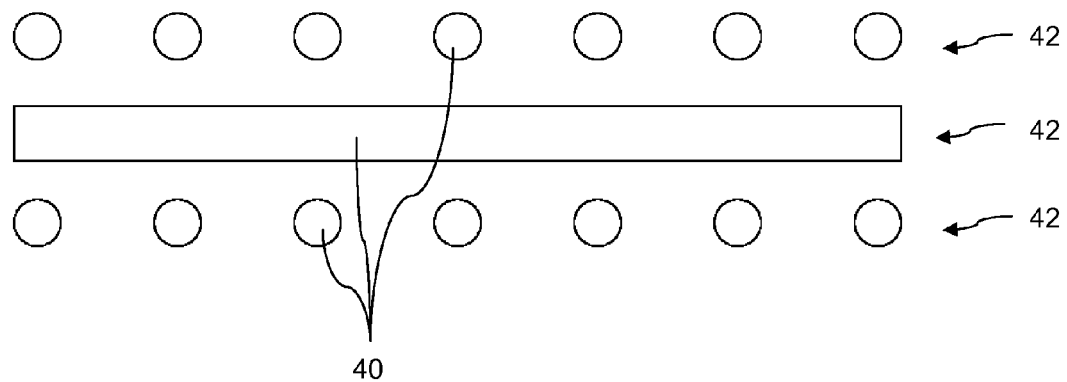
FIGS. 4A and 4B are diagrammatic representations of an embodiment of an orientation of steam delivery pipes within adjacent layers in the multi-layer steam grid, the pipes in adjacent layers being oriented 90 degrees to one another, more particularly
Figure 4B:
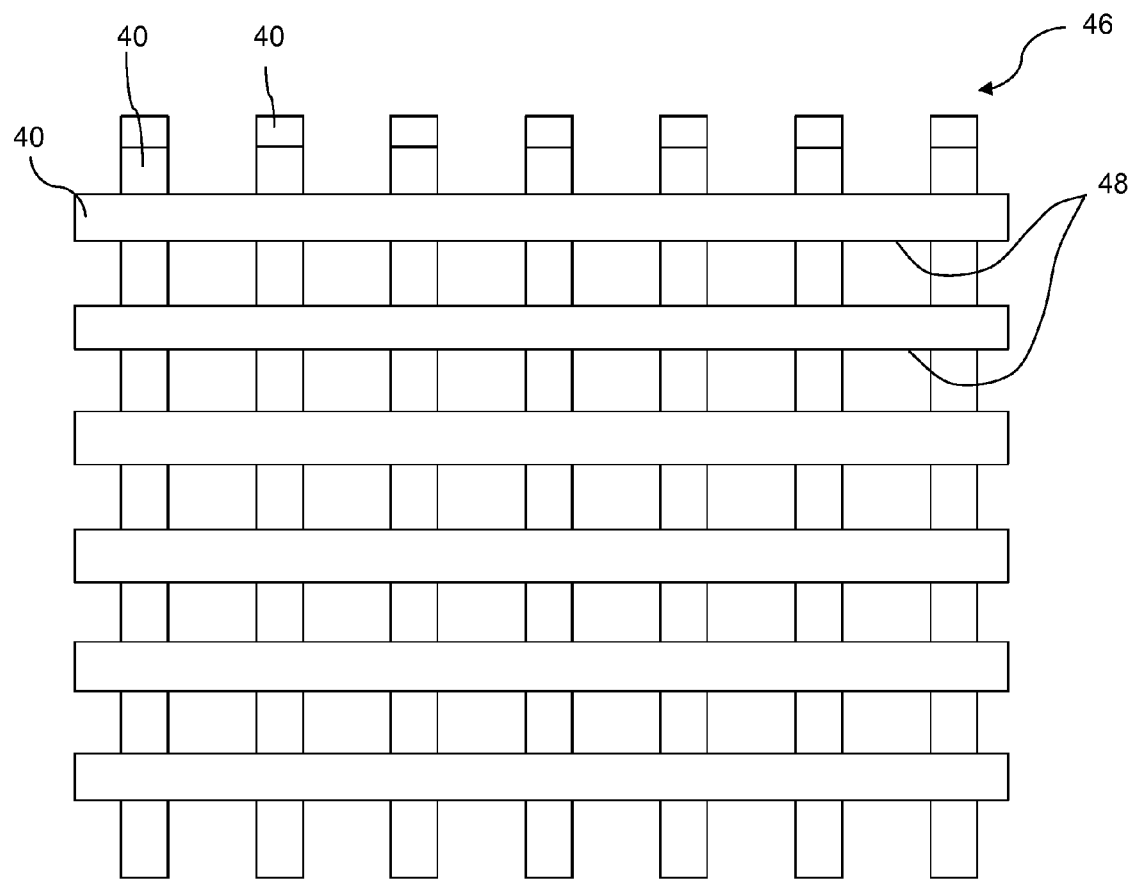
Figure 5A:
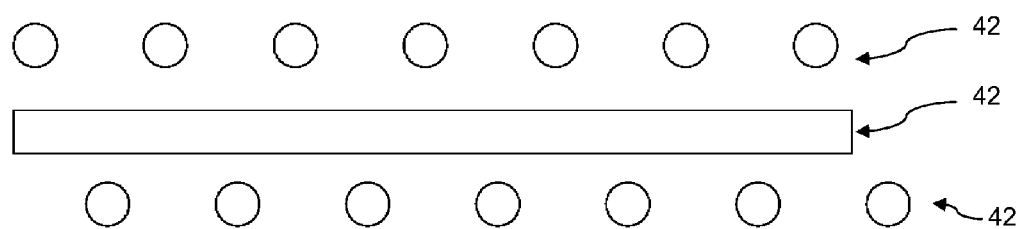
FIGS. 5A and 5B are diagrammatic representations of an embodiment of an orientation of steam delivery pipes within adjacent layers in the multi-layer steam grid, the pipes being oriented 90 degrees to one another and the pipes in every other layer being oriented in the same direction but offset relative to each other, more particularly.
Figure 5B:
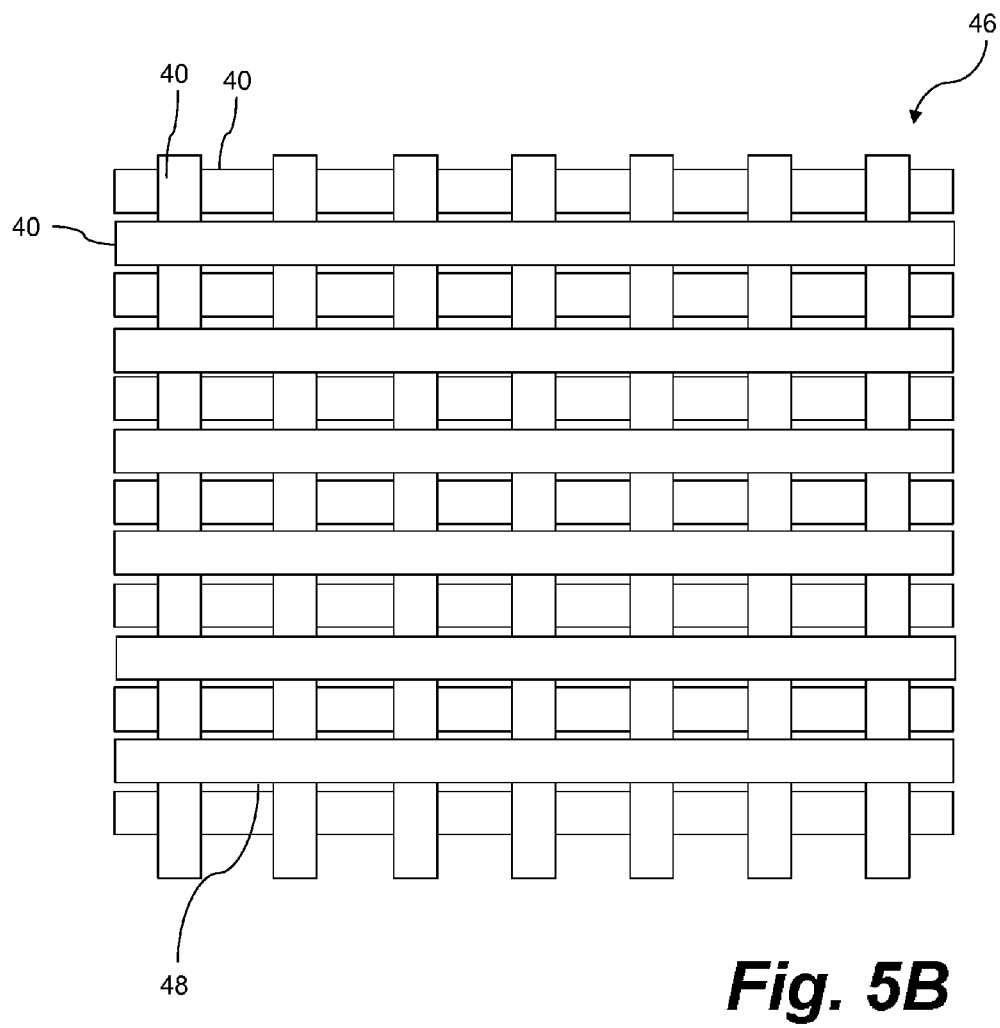
Figure 6A:
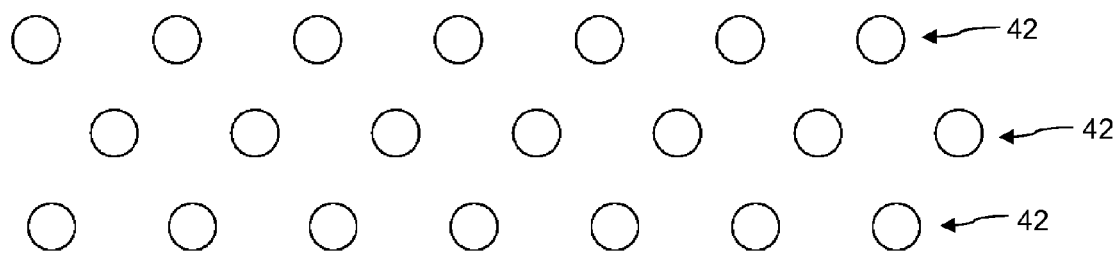
FIGS. 6A and 6B are diagrammatic representations of an embodiment of an orientation of steam delivery pipes within adjacent layers in the multi-layer steam grid, each layer having pipes oriented in the same direction, every other layer having the pipes being offset relative to the pipes in the adjacent layers, more particularly.
Figure 6B:
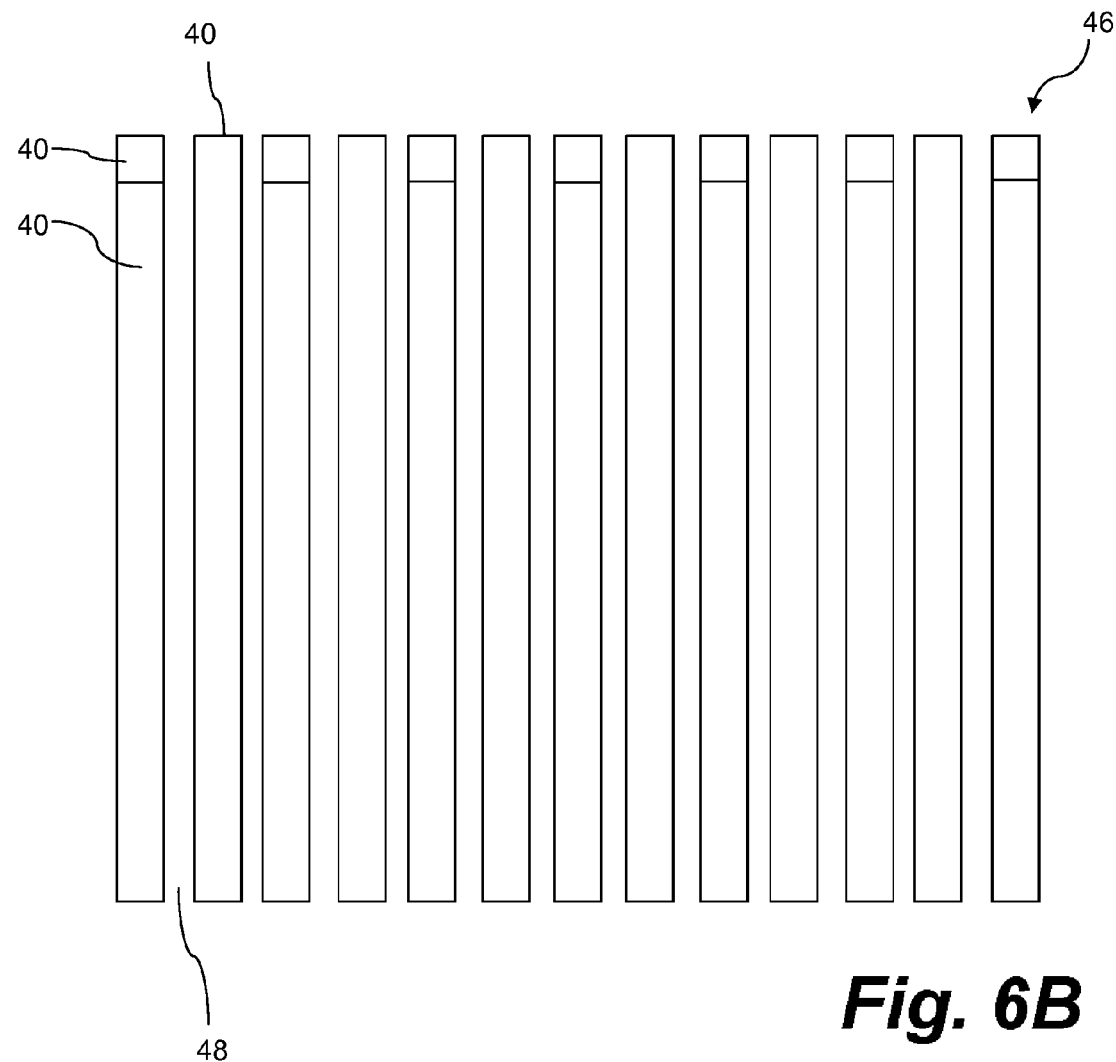

In embodiments, and having reference to FIGS. 4A-6B, the orientation of the steam delivery pipes 40 in each transverse layer 42 are altered, the pipes 40 of one layer 42 being oriented about the axis X of the vessel 12, at an angle relative to the pipes 40 in the one or more adjacent layers 42. Arranged thus, the layers 42 form a vertically extending grid 46 defining through-openings 48 therebetween through which the feed stream F flows down through the grid 30 (FIGS. 4A-4B and FIGS. 5A-5B). Alternatively, the pipes 40 in each layer 42 can be oriented in the same direction (FIGS. 6A-6B). Steam delivery pipes 40 in the adjacent layers 42, regardless of their orientation, can be spaced to be staggered or laterally offset from the pipes 40 in the adjacent layers to create a more tortuous path for the feed stream F (FIGS. 5A-5B and FIGS. 6A-6B).

In an embodiment as shown in FIGS. 4A-4B, the pipes in each layer 42 in the vertically extending grid 46 are oriented about 90 degrees to the adjacent layers 42, being an adjacent upper layer, an adjacent lower layer or both upper and lower adjacent layers.

In an embodiment as shown in FIGS. 5A-5B, the pipes in each layer 42 in the vertically extending grid 46 are oriented about 90 degrees to the adjacent layers 42 being an adjacent upper layer, an adjacent lower layer or both upper and lower adjacent layers. Further the pipes 40, in each layer 42 that is oriented in the same direction are offset laterally from one another for forming the grid 46.

In embodiments, as shown in FIGS. 6A-6B, the pipes 40 in each layer 42 are oriented in the same direction about the axis X of the vessel 12 however, the pipes 40 in one layer 42 are offset from the pipes 40 in the adjacent one or more layers 42 for forming a vertically extending grid 46 having tortuous paths therein through which the feed stream F flows.

The layers 42 in the vertically extending grid 46 are spaced evenly along the vertical height H of the multi-layer steam grid 30. The multi-layer steam grid 30 is positioned in a mid-section of the vessel 12 between the feed inlet 14 and the tailings outlet 18. The number of layers 42 and overall height H required in the vertically extending grid 46 is determined by the heat and mass transfer required for each solvent-containing tailings feed stream F and is related largely to asphaltene content and the temperature of the feed stream F at the feed inlet 14.

The multi-layer steam grid 30 receives the down-coming feed stream F, the feed stream F falling onto the vertically extending grid 46 and flowing over and between the fluidly-connected steam delivery pipes 40 therein.

Figure 8:
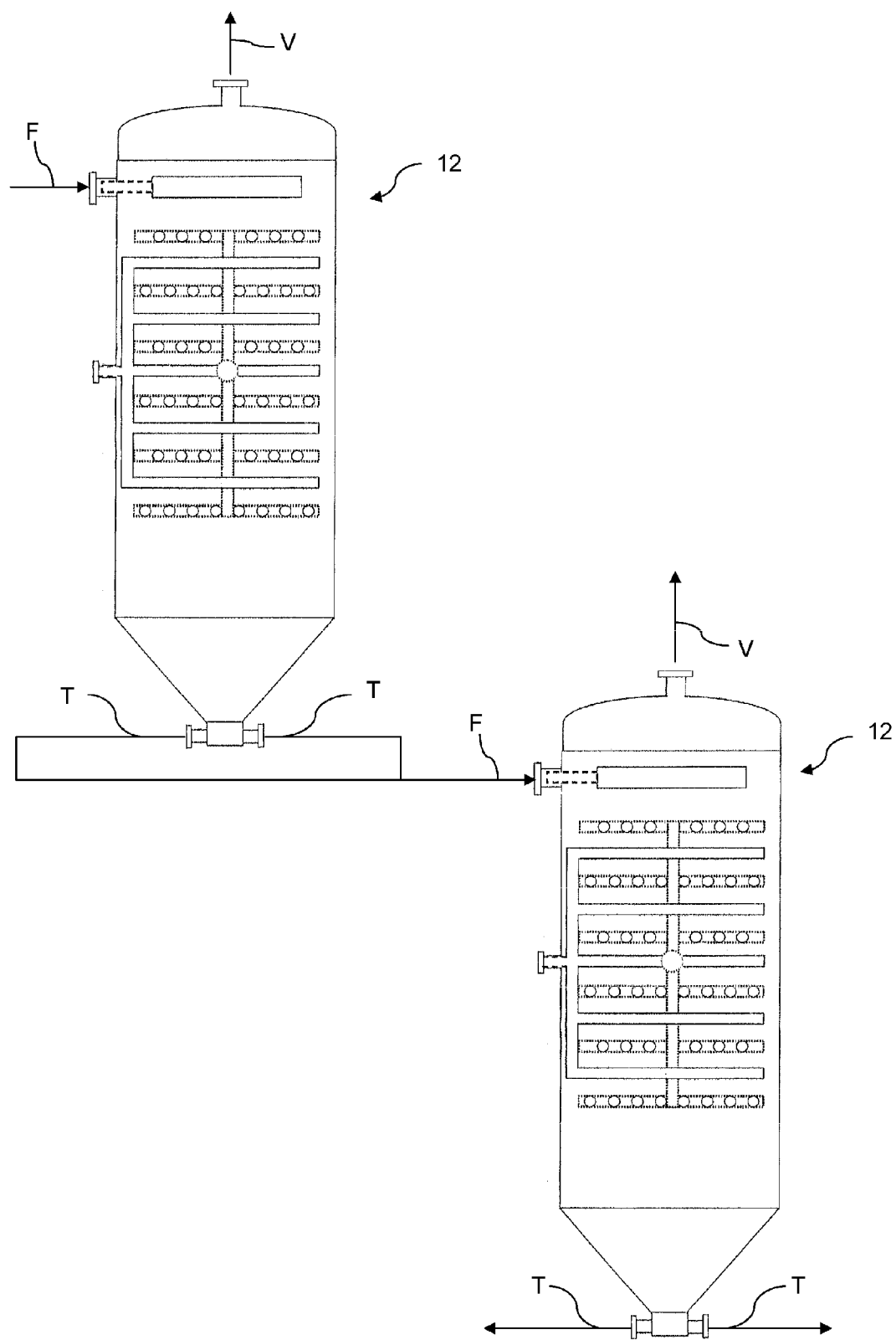
FIG. 8 is a diagrammatic representation of a two-stage system utilizing two TSRU vessels according to embodiments of the disclosure.
Figure 9:
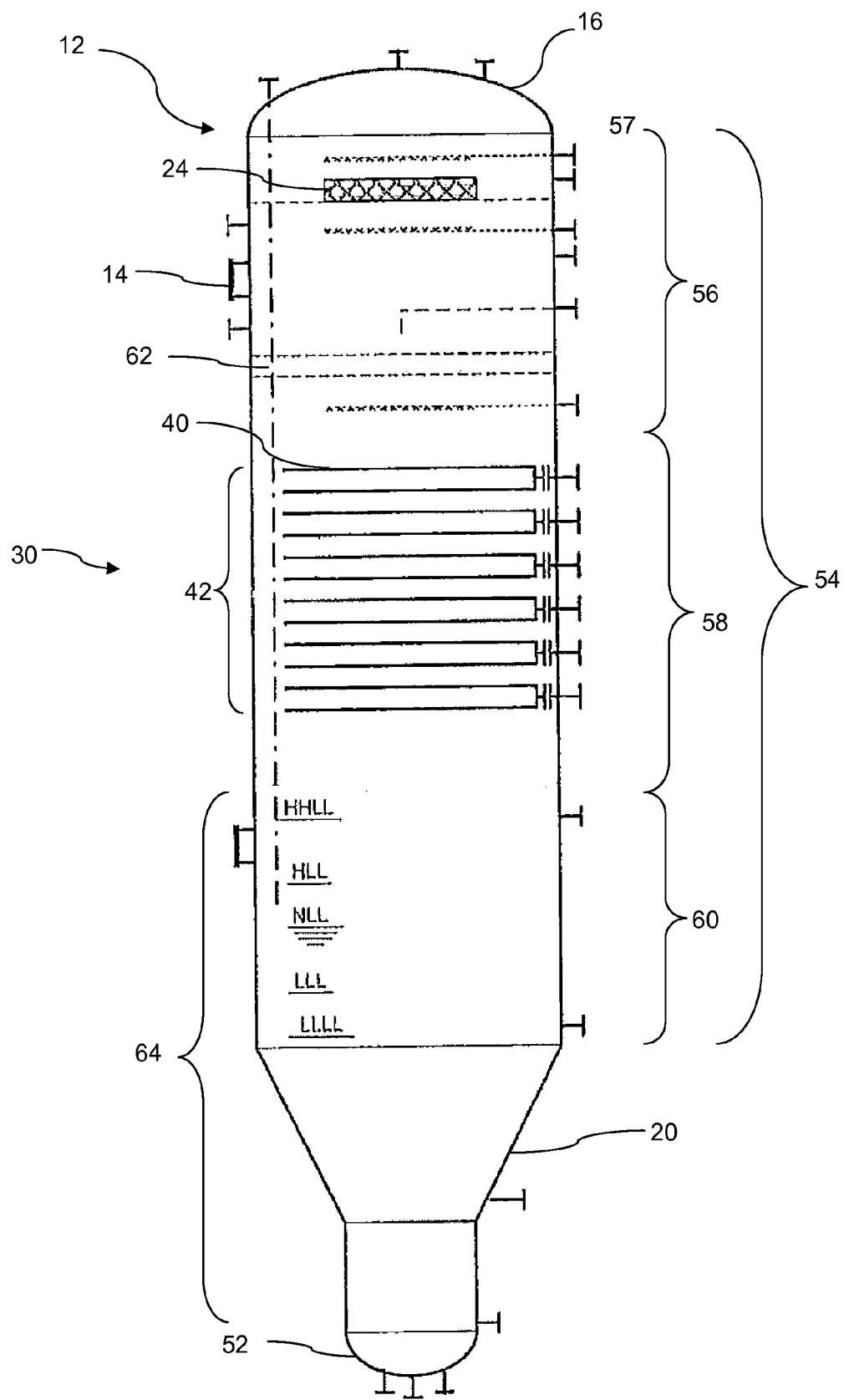
FIG. 9 is a sectional view of a TSRU vessel according to an embodiment of the disclosure.

Generally, as shown in FIGS. 1, 8 and 9, the transverse layers 42 in the vertically extending grid 46 extend across substantially the entirety of the cross-section of the vessel 12 for maximizing the spread of the feed stream F onto the steam delivery pipes 40 as the feed stream F flows through the vertically extending grid 46. In embodiments, the layers 42 are substantially circular in plan, extending across the cross-section of the vessel 12.

Use of the transverse layers 42 of fluidly-connected steam delivery pipes 40 to form the vertically extending grid 46 increases the overall surface area for contacting the feed stream F. The feed stream F becomes evenly distributed throughout the steam grid 30. Thus, the steam grid 30 acts to provide more effective heat and mass transfer thereto.

Having reference again to FIGS. 3A and 3B, in embodiments, the steam delivery pipes 40 are substantially circular in cross-section. The solvent-containing tailings feed stream F, which contacts the surface 38 of the steam delivery pipes 40, is caused to flow or wrap about substantially the entire surface 38 of the pipe 40 as the feed stream F flows by gravity through the multi-layer steam grid 30. Not only does the hot surface 38 of the steam delivery pipe 40 transfer heat to the feed stream F distributed thereon, the feed stream F also wraps thereabout to approach the steam outlets 34 where the feed stream F makes direct contact with the steam S discharging therefrom. Thus, the multi-layer steam grid 30, according to embodiments of the disclosure, provides better contact between the feed stream F and the steam S than with conventional internals, such as shed decks or the like. Thereafter, any remaining steam S rises through the steam grid 30 and the vessel 12, countercurrent to the falling feed stream F, and contacts the feed stream F therein.

Figure 7B:
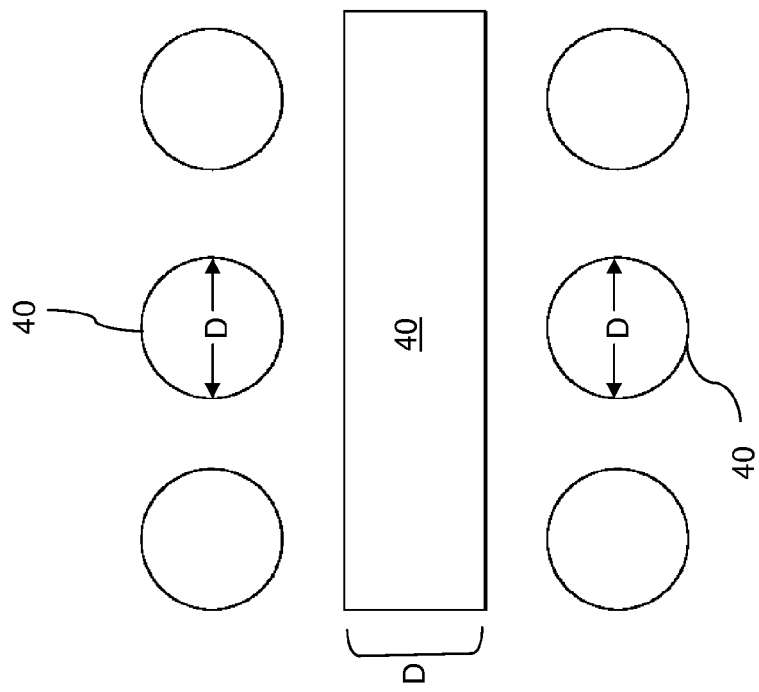
FIGS. 7A and 7B are diagrammatic representations of the heights for an equivalent surface area of vessel internals comparing conventional shed decks (FIG. 7A) to a multi-layer steam grid (FIG. 7B) according to an embodiment of the disclosure.
Figure 7A:
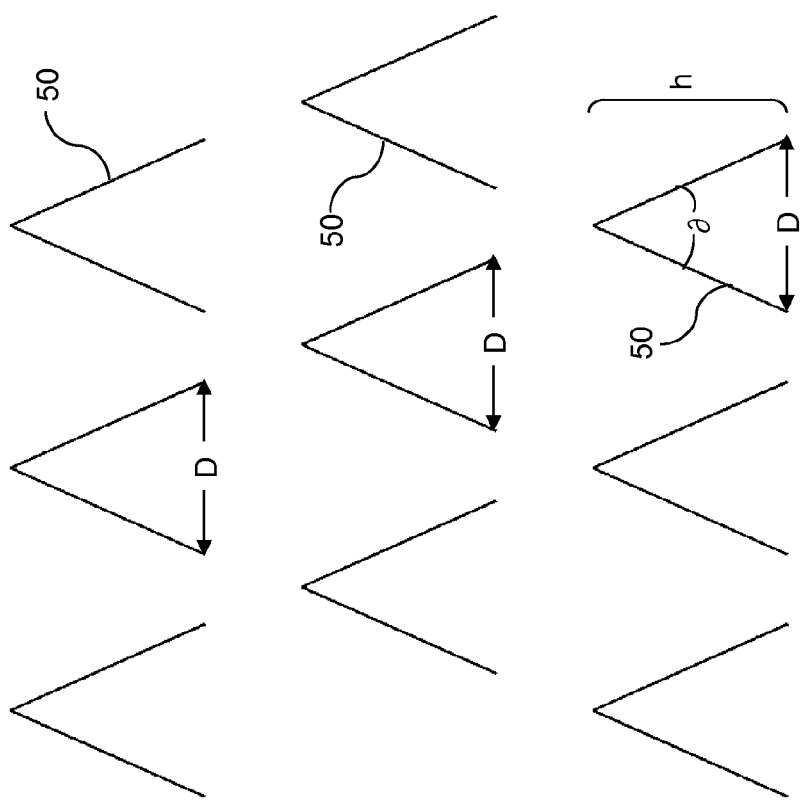

As shown in FIGS. 7A and 7B, in order to obtain an equivalent surface area of prior art shed decks 50 to that achieved using the steam delivery pipes 40, conventional shed decks 50 having an angle $\partial$ of about 37° and a base dimension D, equal to the circumference D of the pipes 40, require a height h approximately 1.5 times that of the diameter of the steam delivery pipes 40. For example, for 10 rows of internals designed to achieve equivalent surface areas, using either shed decks 50 having a base D of 12 inches, or steam delivery pipes 40 having a circumference D of 12 inches, the sum of the heights h of the shed decks 50 would be about 1.5 m for each 1 m of the steam delivery pipes 40.

In the case where shed decks 50 having an angle $\partial$ of 45° are used, an additional 2 rows of shed decks 50 and the respective increase in height are required, compared to the number of layers 42 of steam delivery pipes 40 required to achieve an equivalent surface area.

Advantageously, the vertically extending grid 46 also acts to reduce foaming in the vessel 12. Foaming is typically generated as vapour V leaves a pool P of feed stream F which collects in the bottom 20 of the vessel 12 when residual solvent is vaporized from the pool P. The heated surface 38 of the steam delivery pipes 40 not only acts to maximize solvent release before the feed stream F reaches the bottom 20 of the vessel 12, but also causes any foam which may develop at the surface 38 of the steam delivery pipes 40 to drop to a lower layer 42 through the openings 48 within the vertically extending grid 46. The openings 48 cause the foam to break as it drops therethrough, prior to reaching the pool P.

Further, steam S that condenses inside the steam delivery pipes 40 forms a spray as the condensed steam S exits the plurality of outlets 34 in the vertically extending grid 46. The spray acts to break the foam and wash residual feed stream F from the layers 42 of steam delivery pipes 40 therebelow, which may prevent formation of a fouling film on a surface of the steam delivery pipes 40.

As will be understood by one of skill in the art, a system for removing solvent from a solvent-containing feed stream may comprise a single TSRU stage, using a vessel 12 according to an embodiment of the disclosure.

Further, as shown in FIG. 8, the system may comprise two or more TSRU stages, using a first vessel 12 and at least a second vessel 12, as is known in the art. In the case where multiple stages are used, the vessels 12 in each stage may be operated at different pressures and temperatures.

As an example, the vessel operating pressure in the single or first vessel 12 may be about 50 KPag resulting in a vessel operating temperature of about 112° C. The pressure of the steam in the steam delivery pipes 40 is maintained at about 64 KPag which results in a temperature of about 136° C. The temperature of steam S and condensate exiting the orifices 34 is reduced as a result of heat transferred therefrom to the feed stream F and as a result of cooling with expansion to the lower pressure in the vessel 12. Applicant believes that the steam and condensate exiting the orifices 34 has an exit temperature, being a few degrees higher than the vessel operating temperature.

The vessel operating pressure in the second vessel 12 may be about 20 KPag resulting in a vessel operating temperature of about 105° C. The pressure of the steam in the steam delivery pipes 40 is maintained at about 34 KPag which results in a temperature of about 135° C. As with the first vessel 12, Applicant believes that the steam and condensate exiting the orifices 34 has an exit temperature, being a few degrees higher than the vessel operating temperature.

EXAMPLES

Example 1

In a TSRU vessel 12, designed and modelled for a feed stream F having a composition of about 17 wt % solids, 59 wt % water, 16 wt % solvent and 8 wt % bitumen and comprising a multi-layer steam grid 30 according to an embodiment of the disclosure, the vessel 12 and the steam grid 30 were sized for maximum solvent removal.

Having reference to FIG. 9 and Table 1, a total height of the vessel 12 is about 19 m. The vessel 12 comprises a rounded top 16 and a conical bottom 20 extending to a dish head 52 and a straight vessel section 54 formed therebetween. The straight vessel section 54 is about 16.4 m in height, has an inside diameter of about 4.3 m and comprises a top section 56, a mid section 58 and a lower section 60.

The top section 56, which is about 2.9 m in height, houses the demister pad 24, adjacent an upper end 57, a liquid distribution trough 62 spaced therebelow for distributing the feed F to the mid section 58 of the vessel 12 and the feed inlet 14 positioned therebetween.

The mid section 58, which is about 7.7 m in height, houses the multi-layer steam grid 30 according to an embodiment and provides sufficient space therebelow to space the steam grid 30 above a highest liquid level (HHLL) of a sump 64 in the bottom 20 of the vessel 12. The multi-layer steam grid 30 comprises twelve (12) layers 42 of fluidly-connected steam delivery pipes 40, forming the vertically extending grid 46. The twelve layers 42 are evenly spaced vertically over a total height of about 6.6 m.

TABLE 1

| | Component | Height |
|---|---|---|
| | Bottom vessel diameter | 4.27 m |
| | Top vessel diameter | 4.27 m |
| | Top vessel cross-sectional area | 14.32 m² |
| TOP SECTION | Top water spray | 1050 mm |
| | Demister pad | 200 mm |
| | Bottom water spray | 450 mm |
| | Feed inlet | |
| | Liquid distribution trough typical | 600 mm |
| | Antifoam injection allowance | 600 mm |
| INTERNALS | Internal 12 | — |
| | Internal 11 | 600 mm |
| | Internal 10 | 600 mm |
| | Internal 9 | 600 mm |
| | Internal 8 | 600 mm |
| | Internal 7 | 600 mm |
| | Internal 6 | 600 mm |
| | Internal 5 | 600 mm |
| | Internal 4 | 600 mm |
| | Internal 3 | 600 mm |
| | Internal 2 | 600 mm |
| | Internal 1 | 600 mm |
| | | 1100 mm |
| SUMP | HHLL | 1000 mm |
| | HLL | 1500 mm |
| | NLL | 2000 mm |
| | LLL | 1000 mm |
| | LLLL | 300 mm |
| | Conical section straight height | 2000 mm |
| | Bottom sump straight height | 600 mm |
| | Dish Head | |
| | Total Vessel Height | 19000 mm |

The sump 64 comprises about 5.8 m of the straight vessel section 54 in combination with the remaining lower conical section 60 having a height of about 2.6 m. The total height of the sump 64 is therefore about 8.4 m above the dish head 52 and is designed for storing various levels of liquid therein, particularly the highest liquid level (HHLL). Liquid levels can vary therein between a nominal liquid level (NLL), a lowest liquid level (LLLL), a low liquid level (LLL), a high liquid level (HLL) and the highest liquid level (HHLL)

As shown in FIG. 10, each layer 42 comprises a manifold pipe 66 which extends substantially across the diameter of the vessel 12, the manifold pipe 66 being fluidly connectable to a steam supply. In the twelve layers 42, each odd numbered layer 42o is paired with an even numbered layer 42e and the manifold pipes 66 of the paired odd and even layers 42o,42e are connected at a first end 68 to a nozzle 70 external to the vessel 12 for connection to the steam supply. Each manifold pipe 66 is closed at a second end 72. A plurality of evenly spaced steam delivery pipes 40 extend 90° to the manifold pipe 66 and are fluidly-connected thereto at a first end 74 and are closed at a second end 76 adjacent the vessel wall 78.

In this example, the manifold 66 and the steam delivery pipes 40 are 10" Schedule 40 steel pipe having an outer diameter of about 273 mm. In each layer 42, the steam delivery pipes 40 are spaced apart about 454 mm from centre of pipe to centre of pipe leaving about 181 mm of open spacing therebetween.

In each odd numbered layer 42o, a first pipe P1 and last pipe P1 of a total of nine steam delivery pipes 40 are spaced apart having the centre of the first and last pipes P1 about 317 mm from the vessel wall 78. In each even numbered layer 42e, the first pipe P6 and last pipe P6 of a total of eight steam delivery pipes 40 are spaced apart having the centre of the first and last pipes P6 spaced about 545 mm from the vessel wall 78. Thus, when stacked for forming the multi-layer steam grid 30, all of the steam delivery pipes 40 are oriented in the same direction in all of the layers 42 however the steam delivery pipes 40 in the even numbered layers 42e are offset laterally from the steam delivery pipes 40 in the odd numbered layers 42o. The closed ends 76 of the steam delivery pipes 40 are spaced about 50 mm from the inside wall 78 of the vessel 12.

Figure 11:
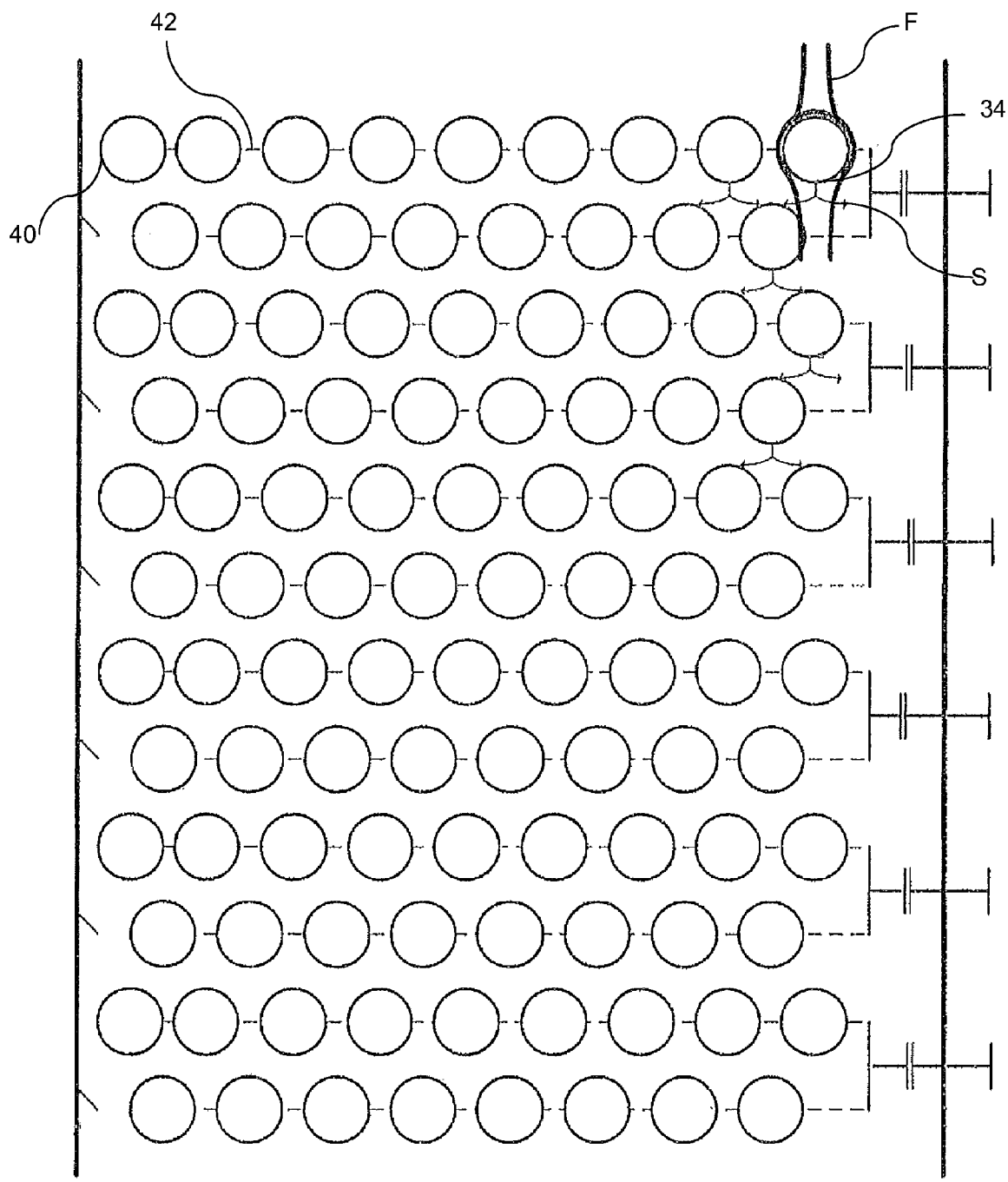
FIG. 11 is a longitudinal sectional view of the multi-layer steam grid arranged according to FIG. 9.

As shown in FIGS. 10 and 11, the length of each of the steam delivery pipes 40 in each layer 42 varies to conform to the shape of the vessel 12. The plurality of outlets or orifices 34 are formed in the downward facing surface or lower wall 44 of each of the pipes 40 for delivery of steam S therefrom. The orifices 34 are evenly spaced along the length of the steam pipe 40. In the example shown, the orifices 34 are 12.7 mm holes. The number of the plurality of orifices 34 along each steam pipe 40 varies from four orifices in the shortest pipes 40 to nine orifices in the longest pipes 40 for the odd numbered layers 42o and from six orifices 34 in the shortest pipes to nine orifices 34 in the longest pipes 40 in the even numbered layers 42e.

As shown in FIG. 11, the steam delivery pipes 40 in each layer 42 are offset from the steam delivery pipes 40 in the adjacent layers 42. The feed slurry F wraps about the steam delivery pipes 40 where heat is transferred thereto and flows from the pipes 40 in each layer 42 through the opening or spaces 48 in the vertically extending grid 46 to directly contact steam S released from the orifices 34 and to contact pipes 40 and steam in the layers 42 therebelow.

The layers 42 of steam delivery pipes 40 in this example are spaced from the adjacent layers 42 at about 600 mm from a centre of the steam delivery pipes 40 in one layer 42 to the centre of the steam delivery pipes 40 in the adjacent layer 42. The resulting space between a lower surface 44 of the steam delivery pipes 40 in an upper layer 42 to a top surface 45 of the steam delivery pipes 40 in the adjacent lower layer 42 is about 327 mm.

Example 2

Figure 12A:
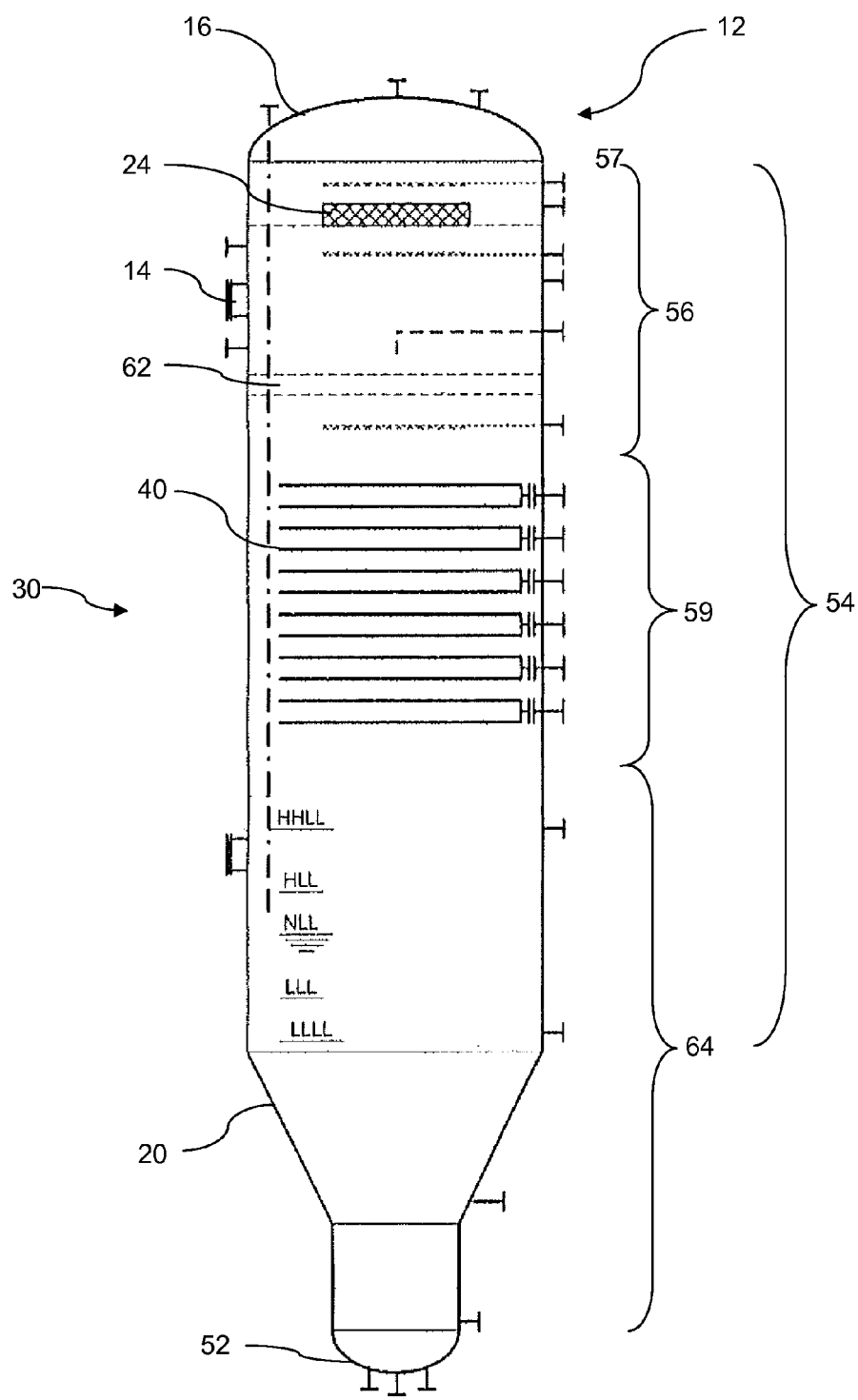
FIGS. 12A and 12B illustrate a comparison between a TSRU vessel having a multi-layer steam grid according to FIG. 11 (FIG. 12A) and a TSRU vessel having a plurality of prior art shed decks (FIG. 12B), for an equivalent, effective surface area, a height of the shed decks being greater than a height of the steam grid and the overall height of the vessel being greater where shed decks are used.
Figure 12B:
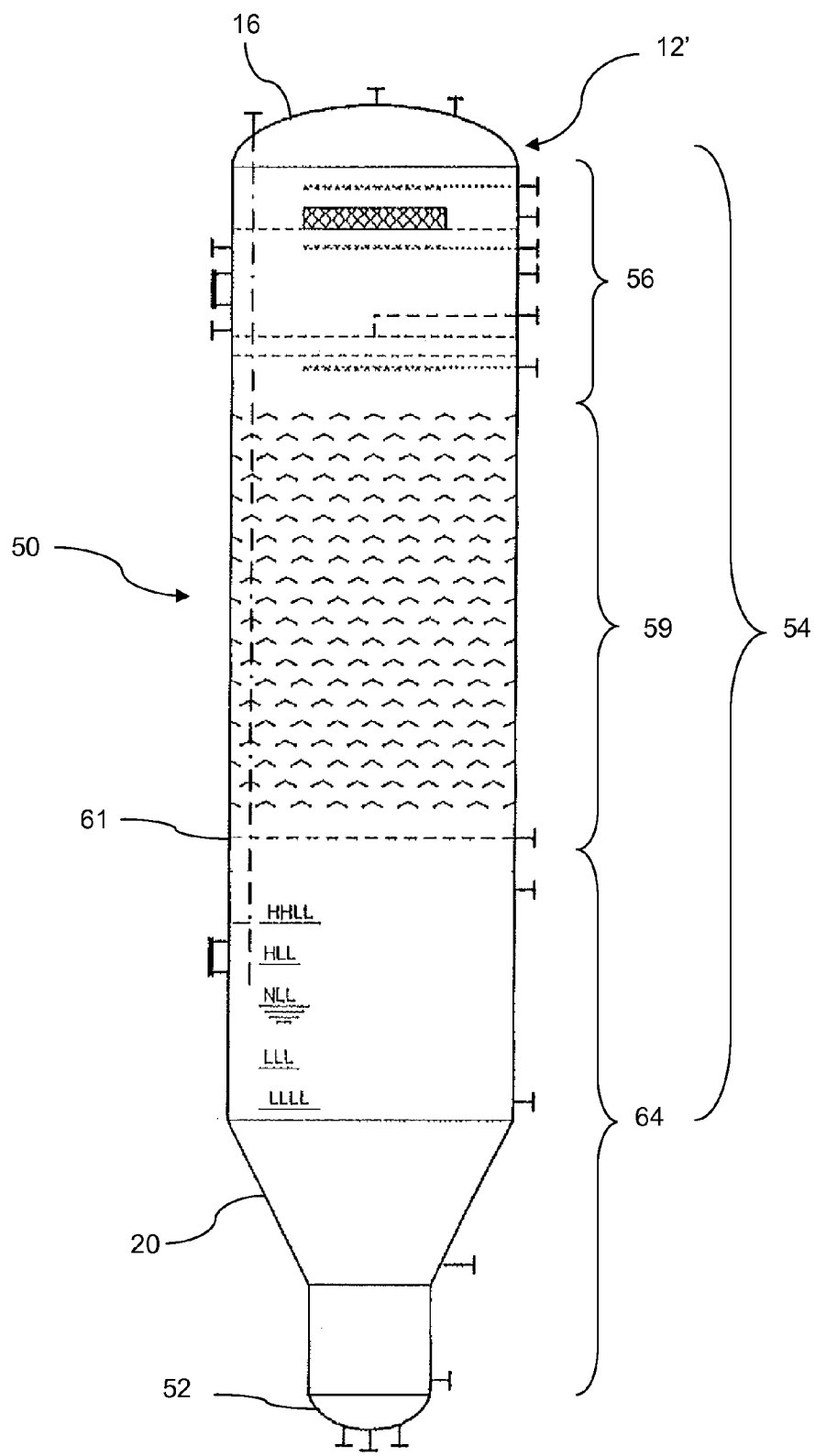

Having reference to FIGS. 12A and 12B, a vessel 12 according to an embodiment (FIG. 12A) and a vessel 12' incorporating prior art shed decks 50 (FIG. 12B) were modelled. The two vessels 12,12' were designed to have internals to achieve substantially the same objectives.

In the case of the vessel 12' with prior art shed decks 50, a heat transfer coefficient was estimated based on the Baffle Tray/Shower Deck Design Guideline published by Fractionation Research, Inc. (FRI) (FRI Handbook, Section 9 Baffle Tray Design, Feb. 15, 2010 published by Fractionation Research Inc.) The estimated heat transfer coefficient is 9.91 Btu/(hr)(ft$^2$)(° F.). The number of trays required to achieve the design heat transfer is 16.

Correlations for mass transfer efficiency of shed decks 50 have not been developed by FRI. The efficiency data obtained from FRI experimental unit on baffle trays of various designs was used to predict a TSRU Column mass transfer efficiency. The experimental mass transfer efficiency is about 15% for the hydrocarbon system, however in the TSRU feed, the solvent is entrapped inside the asphaltenes aggregates with much higher viscosity and therefore 10% mass transfer efficiency is assumed for the TSRU Column design. The number of theoretical stages is 2. The number of actual TSRU Column trays required is 20, set by mass transfer requirements.

In the case of a vessel 12 using a multi-layer steam grid 30 for heat and mass transfer according to an embodiment of the disclosure, a heat transfer coefficient was estimated based on Chilton, Coburn, Generaux and Vernon correlation (Process Heat Transfer; Donald Q. Kern; pp 217, McGraw-Hill, Inc.). The estimated heat transfer coefficient is 21.53 Btu/(hr)(ft$^2$)(° F.), approximately 2.2 times more than the shed-decks design.

In accordance with the Chilton-Colburn analogy (Principles and Modern Applications of Mass Transfer Operations; Benitez, Jaime; pp. 116; John Wiley & Sons, Inc.), based on experimental data to relate heat and mass transfer, the predicted mass transfer efficiency for the multi-layer steam grid 30 is also concluded to be approximately 2.2 times more than the shed deck 50 design. The number of theoretical stages is 2 and the estimated mass transfer efficiency is about 22%. The minimum number of actual layers required is nine. To be conservative, 12 layers of steam delivery pipes 40 are to be installed to provide an additional 30% design margin.

As shown in Table 2 below, the vessel 12' incorporating the prior art shed decks 50 required an additional eight rows of shed decks 50 compared to the layers 42 of steam delivery pipes 40 to achieve the same objectives. The prior art vessel 12' required additional height to accommodate the increase in rows of internals.

Applicant believes that effective solvent recovery is achieved in embodiments of the disclosure, using the shorter steam delivery grid 30 in a vessel 12 of reduced height. Further, Applicant believes that solvent recovery is enhanced beyond that which is predictable by the surface area of the multi-layer steam grid 30 alone, as described herein.

In greater detail, as shown in FIGS. 12A and 12B, TSRU vessels were designed for a feed stream F having a composition of about 17 wt % solids, 59 wt % water, 16 wt % solvent and 8 wt % bitumen and incorporating 2 stages of TSRU. The vessel 12 shown in FIG. 12A comprises a multi-layer steam grid 30 according to an embodiment. The vessel 12' shown in FIG. 12B comprises layers of shed decks 50 according to the prior art. In the vessel 12 shown in FIG. 12A, the steam grid 30 was sized for maximum solvent removal. In the vessel 12' shown in FIG. 12B, the number of layers of shed decks 50 was determined to achieve substantially the same objectives as that of the vessel 12 shown in FIG. 12A.

Having reference to FIG. 12A and Table 2, a total height of the vessel 12 is about 24 m. The vessel 12 comprises a rounded top 16 and a conical bottom 20 extending to a dish head 52 and a straight vessel section 54 formed therebetween. The straight vessel section 54 is about 21 m in height, has an inside diameter of about 4.3 m and comprises a top section 56, an internals section 59 and a sump 64.

TABLE 2

| | Component | Vessel with multi-layer steam grid Height | Vessel with conventional shed decks Height |
|---|---|---|---|
| | Bottom vessel diameter | 4.27 m | 4.27 m |
| | Top vessel diameter | 4.27 m | 4.27 m |
| | Top vessel cross-sectional area | 14.32 m$^2$ | 14.32 m$^2$ |
| TOP SECTION | Top water spray | 1050 mm | 1050 mm |
| | Demister pad | 200 mm | 200 mm |
| | Bottom water spray | 450 mm | 450 mm |
| | Feed inlet Liquid distribution trough typical | 1450 mm | 1450 mm |
| | Antifoam injection allowance | 900 mm | 900 mm |
| INTERNALS | Internal 20 | — | |
| | Internal 19 | — | 762 mm |
| | Internal 18 | — | 762 mm |
| | Internal 17 | — | 762 mm |
| | Internal 16 | — | 762 mm |
| | Internal 15 | — | 762 mm |

TABLE 2-continued

|  | Component | Vessel with multi-layer steam grid Height | Vessel with conventional shed decks Height |
|---|---|---|---|
|  | Internal 14 | — | 762 mm |
|  | Internal 13 | — | 762 mm |
|  | Internal 12 | — | 762 mm |
|  | Internal 11 | 914 mm | 762 mm |
|  | Internal 10 | 914 mm | 762 mm |
|  | Internal 9 | 914 mm | 762 mm |
|  | Internal 8 | 914 mm | 762 mm |
|  | Internal 7 | 914 mm | 762 mm |
|  | Internal 6 | 914 mm | 762 mm |
|  | Internal 5 | 914 mm | 762 mm |
|  | Internal 4 | 914 mm | 762 mm |
|  | Internal 3 | 914 mm | 762 mm |
|  | Internal 2 | 914 mm | 762 mm |
|  | Internal 1 | 914 mm | 762 mm |
|  |  | 1200 mm | 650 |
|  | Steam sparger | — | 650 |
| SUMP | HHLL | 1000 mm | 1000 mm |
|  | HLL | 1500 mm | 1500 mm |
|  | NLL | 2000 mm | 2000 mm |
|  | LLL | 1000 mm | 1000 mm |
|  | LLLL | 300 mm | 300 mm |
|  | Conical section straight height | 2000 mm | 2000 mm |
|  | Bottom sump straight height Dish Head | 600 mm | 600 mm |
|  | Total Vessel Height | 23708 mm | 28228 mm |
|  | Total height of straight portion | 21108 mm | 25628 mm |

The top section 56, which is about 4 m in height, houses at least a demister pad 24 adjacent an upper end 57, a liquid distribution trough 62 spaced therebelow for distributing the feed F to the internals section 59 and a feed inlet 14 positioned therebetween.

The mid or internals section 59, which is about 10 m in height, houses a multi-layer steam grid 30 according to an embodiment and provides sufficient space therebelow to space the steam grid 30 above the highest liquid level (HHLL) of the sump 64 in the bottom 20 of the vessel 12.

The sump 64 comprises about 5.8 m of the straight vessel section 54 in combination with the remaining conical section 60 having a height of about 2.6 m, The total height of the sump 64 is therefore about 8.4 m above the dish head 52 and is designed for storing various levels of liquid therein, particularly the HHLL.

Having reference to FIG. 12B and Table 2, a total height of the vessel 12' is about 28.3 m, being about 4.5 m taller than the vessel shown in FIG. 12A. The vessel 12' also comprises a rounded top 16 and a conical bottom 20 extending to a dish head 52 and a straight vessel section 54 formed therebetween. The straight vessel section 54 is about 26 m in height, being about 4.3 m taller than the vessel 12 shown in FIG. 12A.

The top section 56 of vessel 12' is substantially the same as the top section 56 of the vessel 12 shown in FIG. 12A.

The mid or internals section 59, which is about 14.5 m in height, houses a plurality of layers of shed decks 50 according to the prior art and a steam sparger 61 for the addition of steam S to the vessel 12'. Sufficient space is provided therebelow to space the steam sparger 61 above the HHLL of the sump 64 in the bottom 20 of the vessel 12'. The internals section 59 is about 4.5 m taller than the vessel 12 shown in FIG. 12A, so as to accommodate the additional eight layers of shed decks 50 required to achieve the design objectives and to include the separate steam sparger 61.

The sump 64 is substantially the same as that shown in FIG. 12A.

Having reference again to FIGS. 10, 11 and 12A, the multi-layer steam grid 30 comprises twelve layers 42 of fluidly-connected steam delivery pipes 40. The twelve layers 42 are evenly spaced vertically over a total height of about 10 m. Each layer 42 comprises a manifold pipe 66 which extends substantially across the diameter of the vessel 12, the manifold 66 being fluidly connectable to a steam supply. In the twelve layers, each odd numbered layer 42o is paired with an even numbered layer 42e and the manifold pipes 66 of the paired even and odd layers 42e,42o are connected at a first end 68 to a nozzle 70 external to the vessel 12 for connection to the steam supply. Each manifold pipe 66 is closed at a second end 72. A plurality of evenly spaced steam delivery pipes 40 extend 90° to the manifold pipe 66 and are fluidly-connected thereto at a first end 74 and are closed at a second end 76 adjacent the vessel wall 78.

In this example, shown in FIG. 10, the manifold 66 and the steam delivery pipes 40 are 8" Schedule 40 steel pipe having an outer diameter of about 219 mm. In each layer 42, the steam delivery pipes 40 are spaced apart about 413 mm from centre of pipe to centre of pipe 40 leaving about 194 mm of open spacing therebetween.

In each odd numbered layer 42o, a first pipe P1 and last pipe P1 of a total of nine steam delivery pipes 40 are spaced apart having the centre of the first and last pipes P1 about 450 mm from the vessel wall 78. In each even numbered layer 42e, the first pipe P6 and last pipe P6 of a total of eight steam delivery pipes 40 are spaced apart having the centre of the first and last pipes P6 spaced 656 mm from the vessel wall 78.

Thus, having reference again to FIG. 11, when stacked for forming the multi-layer steam grid 30, all of the steam delivery pipes 40 are oriented in the same direction in all of the layers 42 however the steam delivery pipes 40 in the even numbered layers 42e are offset from the steam delivery pipes 40 in the odd numbered layers 42o. The closed ends 76 of the steam delivery pipes 40 are spaced about 50 mm from the inside wall 78 of the vessel 12.

The layers 42 of steam delivery pipes 40 in the example shown are spaced from the adjacent layers 42 at about 914 mm from a centre of the steam delivery pipes 40 in one layer to a centre of the steam delivery pipes 40 in the adjacent layer 42. The resulting space between a lower surface 44 of the steam delivery pipes 40 in an upper layer 42 to a top surface 45 of the steam delivery pipes 40 in the adjacent lower layer 42 is about 695 mm.

Having reference again to FIGS. 10 and 11, the length of each of the steam delivery pipes 40 in each layer 42 varies to conform to the shape of the vessel 12. A plurality of outlets or orifices 34 are formed in the lower surface 44 of each of the pipes 40 for delivery of steam therefrom. The plurality of orifices 34 are evenly spaced along the length of the steam pipe 40. In this example, the orifices 34 are 12.7 mm holes. The number of orifices 34 along each steam pipe 40 varies from 4 orifices in the shortest pipes to 9 orifices in the longest pipes 40 for the odd numbered layers 42o and from 6 orifices in the shortest pipes to 9 orifices in the longest pipes 40 in the even numbered layers 42e.

Example 3

Testing was performed to determine an optimum configuration for the vertically extending grid 46 of steam delivery pipes 40 which forms the steam grid 30 according to embodiments described herein and to compare the performance to a prior art vessel internal configuration.

In a test vessel, solvent recovery for three different configurations, as shown in FIGS. 13A to 13C, was tested. The feed F is delivered to a top of the test vessel. Solvent vapour V is removed from the top of the vessel and liquid L is removed from the bottom of the test vessel.

Configuration #1 (FIG. 13A) utilizes a prior art arrangement of internals having a vertically extending array of flat plates with steam S delivered below the vertical array.

Configuration #2 (FIG. 13B) utilizes internals according to an embodiment described herein. Substantially round, steam delivery pipes are arranged in layers, the layers forming a vertical stack of layers, the pipes in each layer being oriented in the same direction as the pipes in the adjacent layers and staggered relative thereto. Steam is delivered throughout the internals; and Configuration #3 (FIG. 13C) utilizes internals according to another embodiment described herein. Substantially round, steam delivery pipes arranged in layers, the layers forming a vertical stack of layers, the pipes in each layer being oriented at a 90 degree angle relative to the steam pipes in the adjacent layers and being staggered relative thereto. Steam is delivered throughout the internals.

A mixture of about 9 wt % methanol in water was used as the feed F, which was fed to the vessel at about 10 kg/min. Low-pressure steam S was delivered at a rate of about 1.5 kg/min. Methanol levels in the vessel overflow and underflow were determined based upon density at 25° C. Mass balance was calculated and compared for each of the three configurations.

Linear regression analysis was used to determine methanol recovery and overflow rates under standard process conditions and to determine the inter-relationships between the different configurations and operating conditions.

CONCLUSIONS

Figure 14:
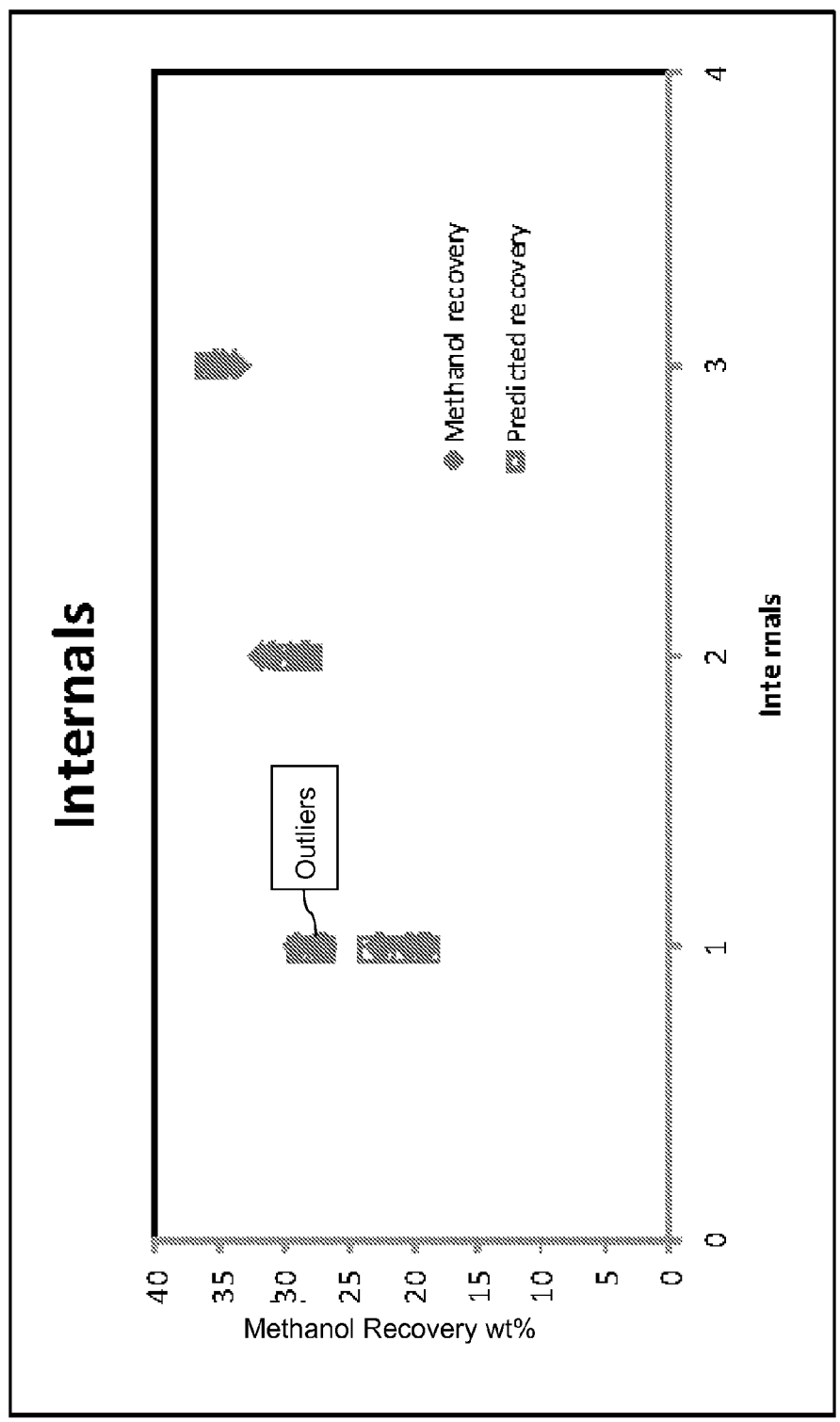
FIG. 14 is a graph of linear regression analysis of methanol recovery data generated from the internals configurations of FIGS. 13A-13C.

Applicant believes that results for Configuration #1 as shown in FIG. 14 include outliers, the sampling in one of the tests being unreliable. Thus, methanol recovery greater than 23 wt % for configuration #1 were excluded for the final comparisons.

As shown in FIG. 14, configuration #2 recovers about 27% more methanol than configuration #1. Configuration #3 recovers about 55% more methanol than configuration #1. Configurations #2 and #3 produce 12% and 24% more overflow, respectively, than configuration #1.

For configuration #3, which demonstrated the highest wt % recovery of methanol, the average feed rate was 10.02 kg/min; the average feed temperature was 73° C.; the average steam flow rate was 0.57 kg/min; the average steam pressure was 3.4 psi; the average steam temperature was 105° C.; the average overflow rate was 0.82 kg/min; the average overflow temperature was 93° C.; the average underflow flow rate was 10.49 kg/min; and the average underflow temperature was 96° C.

Further, based on linear regression analysis, it was also demonstrated that internal configuration, water-methanol feed rates and feed temperature have a statistically significant effect on methanol recovery and overflow mass transfer.

The embodiments of the invention for which an exclusive property or privilege is claimed are defined as follows:

1. A method for recovering solvent from a non-homogeneous solvent-containing tailings feed stream in a vessel having internals therein, the method comprising:
    flowing the non-homogeneous solvent-containing tailings feedstream from a top of the vessel, about the internals and to a bottom of the vessel, the internals comprising a plurality of fluidly connected pipes arranged in vertically stacked layers for forming a vertically extending grid;
    conducting steam within the vertically extending grid of fluidly-connected pipes for flowing therethrough at a pressure greater than the vessel operating pressure for heating a surface of the plurality of fluidly-connected pipes to the temperature greater than a vessel temperature;
    discharging the steam to the vessel at a plurality of locations throughout the plurality of fluidly-connected pipes to the vessel, the steam flowing countercurrent to the solvent-containing tailings feedstream in the vessel;
    removing solvent vapour from the top of the vessel; and
    discharging a solvent-depleted tailings stream from the bottom of the vessel;
    wherein the steam flows throughout the internals at a pressure greater than a vessel operating pressure for heating the internals to a temperature greater than a vessel temperature.

2. The method of claim 1 further comprising:
    discharging the steam from a plurality of outlets formed in the fluidly-connected pipes, the outlets being sized for maintaining the steam flowing therein at the pressure greater than the vessel pressure.

3. The method of claim 1 wherein the steam grid comprises two or more vertically stacked layers of parallel, spaced apart fluidly-connected pipes, the method comprising:
    aligning the fluidly-connected pipes in the two or more layers in the same direction relative to an axis of the steam grid; and
    spacing the fluidly connected pipes in each of the two or more layers to be laterally offset relative to one or more adjacent layers of the two or more layers.

4. The method of claim 1 wherein the steam grid comprises two or more vertically stacked layers of parallel, spaced apart fluidly-connected pipes, the method comprising:
    aligning the fluidly-connected pipes in one or more of the two or more adjacent layers at an angle about a vertical axis of the vessel relative to the plurality of pipes in one or more adjacent layers of the two or more layers.

5. The method of claim 4 further comprising:
    spacing the fluidly connected pipes in each of the two or more layers to be laterally offset relative to one or more layers of the two or more layers.

6. The method of claim 1, wherein the fluidly-connected pipes are substantially circular in cross-section, further comprising:
    discharging the steam from a plurality of outlets formed in a downward-facing portion of a surface of the fluidly-connected pipes; and
    flowing the feedstream about the surface of the substantially circular pipes toward the outlets.

7. The method of claim 1 wherein the vessel is a first vessel, the method comprising:
    discharging the solvent-depleted tailings stream from the bottom of the first vessel to a second vessel; and
    operating the second vessel at an operating pressure and temperature different than the first vessel.

8. The method of claim 6 wherein a portion of the steam condenses within the fluidly-connected pipes, the method further comprising:
    spraying the condensed steam from the plurality of outlets toward the fluidly connected pipes therebelow.

9. The method of claim 1 wherein the internals extend across an entirety of a cross-section of the vessel, the method further comprising:

distributing the solvent-containing tailings feedstream flowing about the internals across the cross-section of the vessel for contacting the steam discharged at the plurality of locations throughout.

10. The method of claim 1, wherein the discharging steam to the vessel at the plurality of locations throughout the internals, further comprises:

maintaining a partial pressure throughout the vessel at a partial pressure for acting as a driver for promoting mass transfer therein.

11. The method of claim 1 wherein the non-homogeneous solvent-containing tailings feedstream comprises asphaltene agglomerates, the method further comprising:

heating the asphaltene agglomerates at the internals to the temperature greater than vessel temperature for softening the asphaltene agglomerated for permitting vaporizing and release of solvent trapped therein.

12. The method of claim 11, wherein when the asphaltene agglomerates are softened, further comprising:

maintaining the temperature of the internals greater than the vessel temperature for prolonging the softened state of the asphaltenes for vaporization of solvent trapped therein.

13. A method for recovering solvent from a non-homogeneous solvent-containing tailings feedstream in a vessel operated at a vessel temperature and a vessel pressure, the method comprising:

pressurizing a plurality of fluidly-connected pipes, arranged in vertically stacked layers forming internals in the vessel, with steam to a pressure for heating a surface of the internals to a temperature greater than the vessel temperature;

discharging the steam from the fluidly connected pipes to the vessel at a plurality of locations along the vessel;

distributing the tailings feedstream over the surface of the internals for generating a solvent vapour and a solvent-depleted feedstream therefrom;

discharging the solvent vapour from the vessel above the internals; and discharging the solvent-depleted feedsteam from below the internals.

14. The method of claim 13, further comprising:

discharging the steam from a plurality of outlets formed in a downward-facing portion of a surface of the fluidly-connected pipes.

15. The method of claim 13 wherein the vessel is a first vessel, the method comprising:

discharging the solvent-depleted tailings stream from the bottom of the first vessel to a second vessel; and operating the second vessel at an operating pressure and temperature different than the first vessel.

16. The method of claim 14 wherein a portion of the steam condenses within the fluidly-connected pipes, the method further comprising:

spraying the condensed steam from the plurality of outlets toward the fluidly connected pipes in the layers therebelow.

17. The method of claim 14 wherein the fluidly-connected pipes are substantially circular in cross-section, the method comprising:

flowing the feedstream about the surface of the substantially circular pipes toward the outlets.

18. The method of claim 13, wherein the discharging the steam from the internals to the vessel at a plurality of locations along the vessel comprises:

maintaining a partial pressure throughout the vessel at a partial pressure for acting as a driver for promoting mass transfer therein.

\* \* \* \* \*